(12) United States Patent
Altice et al.

(10) Patent No.: US 7,966,207 B2
(45) Date of Patent: Jun. 21, 2011

(54) METHOD, SYSTEM AND PROGRAM PRODUCT FOR MANAGING FULFILLMENT OF ORDERS

(75) Inventors: Brad M. Altice, Wake Forest, NC (US); Charles S. Atkinson, Apex, NC (US); Robert J. Banker, Raleigh, NC (US); Ji Yuan Bian, Shanghai (CN); Edward H. Carter, Raleigh, NC (US); Leonid Derbinsky, Cary, NC (US); Docelyn Lordeus, Raleigh, NC (US); Anandakrishnan Narayanan, Morrisville, NC (US); Aparicio I. Ranghel, Cary, NC (US); William J. Reilly, Cary, NC (US); Jorge M. Salas, Durham, NC (US); Yi-Wen C. Tan, Raleigh, NC (US); Deirdre A. Wessel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 11/852,347

(22) Filed: Sep. 10, 2007

(65) Prior Publication Data
US 2009/0070176 A1 Mar. 12, 2009

(51) Int. Cl.
*G06Q 10/00* (2006.01)
*G06F 19/00* (2011.01)
(52) U.S. Cl. ...... 705/7.11; 705/301; 705/7.12; 705/7.23
(58) Field of Classification Search ............... 705/1, 1.1, 705/7, 8, 301, 7.11, 7.12, 7.13, 7.16, 7.17, 705/7.22, 7.23
See application file for complete search history.

(56) References Cited

U.S. PATENT DOCUMENTS

| | | | |
|---|---|---|---|
| 7,403,927 B2* | 7/2008 | Meaney et al. | 705/500 |
| 2001/0032111 A1* | 10/2001 | Jensen et al. | 705/8 |
| 2002/0069096 A1* | 6/2002 | Lindoerfer et al. | 705/7 |
| 2002/0072986 A1* | 6/2002 | Aram | 705/26 |
| 2004/0117230 A1* | 6/2004 | Jones et al. | 705/8 |
| 2005/0015167 A1* | 1/2005 | Searcy et al. | 700/100 |
| 2005/0015288 A1* | 1/2005 | Reeves et al. | 705/8 |

OTHER PUBLICATIONS

"Axapta Support for Microsoft SQL Server 7.0 Provides Performance and Growth Benefits for Manufacturing Enterprises" Nov. 16, 1998, Business Editors & Technology Writers.*

* cited by examiner

*Primary Examiner* — Fadey S Jabr
*Assistant Examiner* — Michael Harrington
(74) *Attorney, Agent, or Firm* — John R. Pivnichny; Law Office of Jim Boice

(57) ABSTRACT

A method, system and program product for optimally managing fulfillment of orders that are channeled through a diversified manufacturing environment that utilizes different process models, product nomenclatures and communication methods. The method includes sending by a contemporary fulfillment application to a legacy application a scheduling request for an order that includes a code recommending that the order is deemed eligible for fulfillment by a specific manufacturing site. The method further includes returning by the legacy application a scheduling response providing scheduling information for the order and confirming that the order is to be fulfilled by the specific manufacturing site. The method further includes transmitting a shipment request by the contemporary fulfillment application to a contemporary production application for routing delivery of the order to the specific manufacturing site and receiving a shipment response from the contemporary production application providing a delivery status of the order.

23 Claims, 28 Drawing Sheets

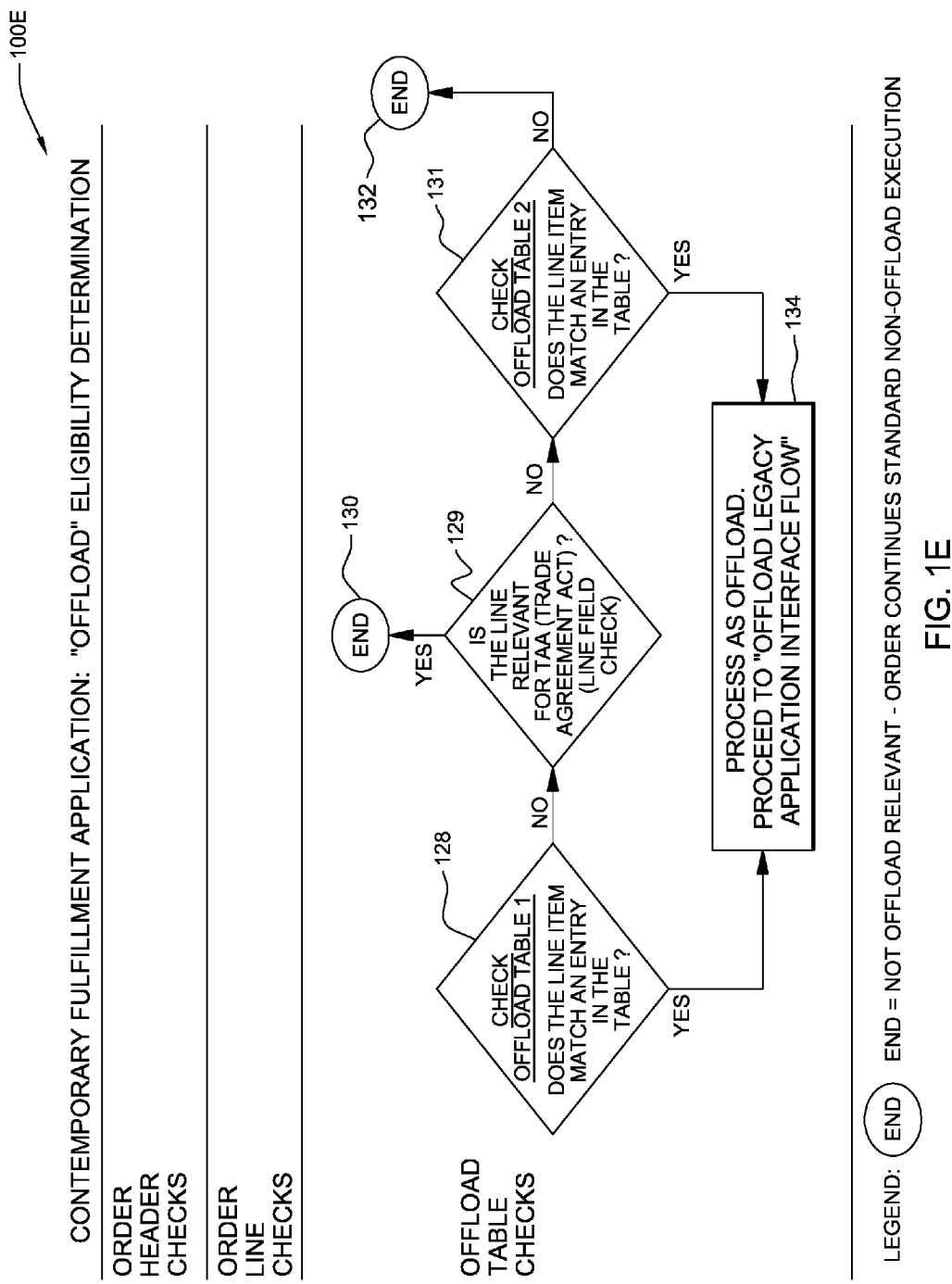

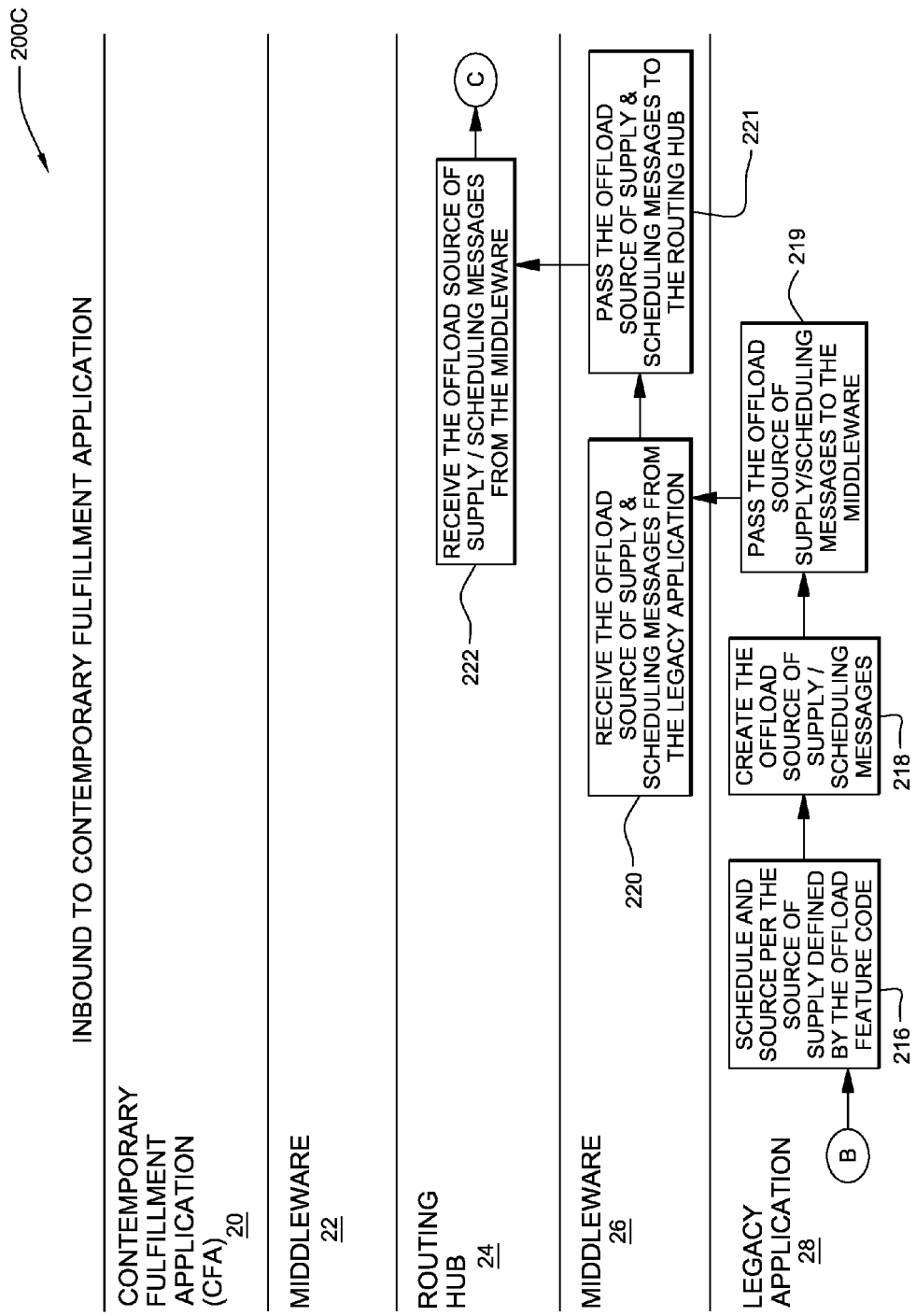

METHOD, SYSTEM AND PROGRAM PRODUCT FOR MANAGING FULFILLMENT OF ORDERS

FIELD OF THE INVENTION

The present invention relates to computer systems and software, and more specifically to an automated technique for managing fulfillment of orders that are channeled through a diversified manufacturing environment.

BACKGROUND OF THE INVENTION

Businesses often process customer orders by communicating or routing the orders to different manufacturing systems for fulfilling the orders. Often, these different manufacturing systems utilize separate process models, product nomenclatures and communication methods. As such, communicating the orders to manufacturing systems and other downstream applications while masking such differences to users can be a huge undertaking. As such, there is a need for a business to provide a cost-effective solution for routing or communicating orders to manufacturing systems utilizing different manufacturing models and to provide a solution that provides the flexibility or option to change criteria for routing the orders based on source capacities, etc. without impacting those downstream applications unable to accommodate the necessary changes.

SUMMARY OF THE INVENTION

In a first aspect of the invention, there is provided a method of managing orders. The method includes determining, using a contemporary fulfillment application, whether an order of a plurality of orders is eligible for forwarding to a specific manufacturing site for fulfillment of the order, if the order is eligible for forwarding to the specific manufacturing site, sending a scheduling request message from the contemporary fulfillment application to a legacy scheduling application, the scheduling request message including a code recommending to the legacy scheduling application that the order is to be fulfilled by the specific manufacturing site, wherein the contemporary fulfillment application manages fulfillment of the order by the specific manufacturing site. Further, the method includes returning, by the legacy scheduling application to the contemporary fulfillment application, a scheduling response message providing scheduling information for the order and confirming that the order is to be fulfilled by the specific manufacturing site via management by the contemporary fulfillment application, transmitting a shipment request message by the contemporary fulfillment application to a contemporary production application for routing delivery of the order to the specific manufacturing site for fulfillment of the order and receiving a shipment response message from the contemporary production application providing a delivery status of the order routed to the specific manufacturing site. In an embodiment, the determining step further includes inspecting a header for the order to determine if the order is eligible for forwarding to the specific manufacturing site, conducting checks for each line item of one or more line items contained in the order to determine if the order is eligible for forwarding to the specific manufacturing site and checking whether a line item of the one or more line items contained in the order is stored in a table of one or more tables within the contemporary fulfillment application in order to process the order. In an embodiment, the sending step further includes sending by the contemporary fulfillment application to a messaging application the scheduling request message having a first format native to the contemporary fulfillment application, reformatting by the messaging application the scheduling request message received from the contemporary fulfillment application having the first format into a scheduling request message having a second format native to the legacy scheduling application and forwarding the scheduling request message having the second format to the legacy scheduling application. In an embodiment, the returning step further includes returning, by the legacy scheduling application, the scheduling response message having the second format, reformatting by the messaging application the scheduling response message having the second format into a scheduling response message having the first format and forwarding the scheduling response message having the second format to the contemporary fulfillment application. In an embodiment, the transmitting step further includes generating, by the contemporary fulfillment application, a list of delivery due dates corresponding to a plurality of orders to be fulfilled by the manufacturing site, determining if a date is reached when materials for fulfilling the order are available at the specific manufacturing site and, if so, transmitting the shipment request message to the contemporary production application for routing to the specific manufacturing site for initiating shipment of the order. In an embodiment, the receiving step further includes routing, by the contemporary production application, the shipment request message received from the contemporary fulfillment application to the specific manufacturing site and establishing, by the contemporary production application, a delivery status for the order fulfilled by the specific manufacturing site, wherein the delivery status includes at least one of: complete shipment, partial shipment and no shipment. The method further includes updating, by the contemporary fulfillment application, a table configured to track the delivery status of the order shipped from the specific manufacturing site. Further, the method includes closing out, by the contemporary fulfillment application, a portion of the order in the shipment request that has been processed and pending closing of the order until the legacy scheduling application has conveyed shipment information pertaining to any portion of the order that has been routed to a manufacturing site determined by the legacy scheduling application.

In another aspect of the invention, there is provided a system for routing a customer order to a preferred manufacturing site. The system includes a first application configured to send a scheduling request corresponding to a customer order received, the scheduling request including an administrative feature code designating that the customer order be fulfilled by a preferred manufacturing site, wherein the first application is further configured to manage routing of the customer order directly, a second application configured to receive the scheduling request sent by the first application, the second application being configured to send to the first application a scheduling response including a manufacturing plant identification code set to correspond to the preferred manufacturing site designated for fulfilling the customer order, the second application being unable to directly route the customer order to the preferred manufacturing site and a third application configured to receive from the first application a shipment request for the customer order to be fulfilled by the preferred manufacturing site designated, the third application being configured to route the customer order to the preferred manufacturing site and to send back to the first application a shipment response notifying the first application of a delivery status for the customer order routed to the preferred manufacturing site. In an embodiment, the first application is further configured to determine if the customer order is to be fulfilled by the preferred manufacturing site and, if so, to include the administrative feature code in the scheduling request sent to the second application requesting that the customer order be fulfilled by the preferred manufacturing site. In an embodiment, the first application is further configured to ascertain a date when materials are available at the preferred manufacturing site for shipping the customer order and to generate, upon reaching the date ascertained, the shipment request for sending to the third application for routing the customer order to the preferred manufacturing site for shipment. In an embodiment, the first application is further configured to update a table for tracking a delivery status for the customer order shipped from the preferred manufacturing site. In an embodiment, the third application is further configured to provide to the first application a delivery status for the customer order routed to the preferred manufacturing site and wherein the second application is further configured to provide to the first application a shipping status for any portion of the customer order routed to a legacy manufacturing site. In an embodiment, the first application is a fulfillment application, the second application is a scheduling and sourcing application and the third application is a production application.

In yet another aspect of the invention, there is provided a computer program product for managing a customer order. The computer program product includes a computer readable medium and first program instructions to determine, using a first application, whether a customer order is eligible for forwarding to a specific manufacturing site for fulfillment of the customer order, the first program instructions including instructions to send, if the customer order is determined to be eligible, a scheduling request message having a code for designating that the customer order be fulfilled by the specific manufacturing site. The computer program product further includes second program instructions to return, using a second application, a scheduling response message providing scheduling information for the customer order and confirming that the customer order is to be fulfilled by the specific manufacturing site and wherein the customer order is to be managed by the first application and third program instructions to transmit a shipment request message from the first application to a third application for routing delivery of the customer order to the specific manufacturing site for fulfillment of the customer order, the third program instructions including instructions to receive a shipment response message from the third application providing a delivery status of the customer order routed to the specific manufacturing site. In an embodiment, the first program instructions include instructions to inspect a header, to conduct checks for each line item of one or more line items contained in the customer order and to check whether a line item of the one or more line items contained in the customer order is stored in a table of one or more tables within the first application in order to process the customer order for fulfillment by the specific manufacturing site. In an embodiment, the second program instructions include instructions to reformat, using a messaging application, the scheduling request message from a first format native to the first application into a second format native to the second application before sending the scheduling request message to the second application. In an embodiment, the second program instructions include instructions to reformat, using the messaging application, the scheduling response message having the second format native to the second application into the scheduling response message having the first format native to the first application before returning the scheduling response message to the first application. In an embodiment, the third program instructions include instructions to generate, using the first application, a list of delivery due dates corresponding to a plurality of customer orders to be fulfilled by the manufacturing site, to determine if a date is reached when materials for fulfilling the customer order are available at the specific manufacturing site and, if so, to transmit the shipment request message to the contemporary production application for routing to the specific manufacturing site for initiating shipment of the customer order. In an embodiment, the first application is a fulfillment application, the second application is a scheduling and sourcing application and the third application is a production application. Further, in an embodiment, the delivery status includes at least one of complete shipment, partial shipment and no shipment. Preferably, each of the first, second and third program instructions are recorded on the computer readable medium.

Further yet, in another aspect of the invention, there is provided a process for deploying computing infrastructure including integrating computer-readable code into a computing system, wherein the code in combination with the computing system is capable of performing a process for managing orders in a diversified manufacturing environment. The process includes determining, using a contemporary fulfillment application, whether an order of a plurality of orders is eligible for forwarding to a specific manufacturing site for fulfillment of the order, if the order is eligible for forwarding to the specific manufacturing site, sending a scheduling request message from the contemporary fulfillment application to a legacy scheduling application, the scheduling request message including a code recommending to the legacy scheduling application that the order is to be fulfilled by the specific manufacturing site, wherein the contemporary fulfillment application manages fulfillment of the order by the specific manufacturing site. The process further includes returning, by the legacy scheduling application to the contemporary fulfillment application, a scheduling response message providing scheduling information for the order and confirming that the order is to be fulfilled by the specific manufacturing site via management by the contemporary fulfillment application, transmitting a shipment request message by the contemporary fulfillment application to a contemporary production application for routing delivery of the order to the specific manufacturing site for fulfillment of the order and receiving a shipment response message from the contemporary production application providing a delivery status of the order routed to the specific manufacturing site, wherein the delivery status includes at least one of: complete shipment, partial shipment and no shipment. Furthermore, the process includes updating, by the contemporary fulfillment application, a table configured to track the delivery status of the order shipped from the specific manufacturing site, closing out, by the contemporary fulfillment application, a portion of the order in the shipment request that has been processed and pending closing of the order until the legacy scheduling application has conveyed shipment information pertaining to any portion of the order that has been routed to a manufacturing site determined by the legacy scheduling application. In an embodiment, the determining step further includes inspecting a header for the order to determine if the order is eligible for forwarding to the specific manufacturing site, conducting checks for each line item of one or more line items contained in the order to determine if the order is eligible for forwarding to the specific manufacturing site and checking whether a line item of the one or more line items contained in the order is stored in a table of one or more tables within the contemporary fulfillment application in order to process the order. In an embodiment, the sending step further includes sending by the contemporary fulfillment application to a messaging application the scheduling request message having a first format native to the contemporary fulfillment application, reformatting by the messaging application the scheduling request message received from the contemporary fulfillment application having the first format into a scheduling request message having a second format native to the legacy scheduling application and forwarding the scheduling request message having the second format to the legacy scheduling application. In an embodiment, the returning step further includes returning, by the legacy scheduling application, the scheduling response message having the second format, reformatting by the messaging application the scheduling response message having the second format into a scheduling response message having the first format and forwarding the scheduling response message having the second format to the contemporary fulfillment application. In an embodiment, the transmitting step further includes generating, by the contemporary fulfillment application, a list of delivery due dates corresponding to a plurality of orders to be fulfilled by the manufacturing site, determining if a date is reached when materials for fulfilling the order are available at the specific manufacturing site and if so, transmitting the shipment request message to the contemporary production application for routing to the specific manufacturing site for initiating shipment of the order.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 1A-1E illustrate a method of determining eligibility of an order for offloading to a specific manufacturing site, in accordance with an embodiment of the invention.

FIGS. 2A-2I illustrate an offload scheduling process of an order sent from the contemporary fulfillment application to a legacy application for optimizing management of an order, in accordance with an embodiment of the invention.

DETAILED DESCRIPTION OF THE INVENTION

Figure 1A:
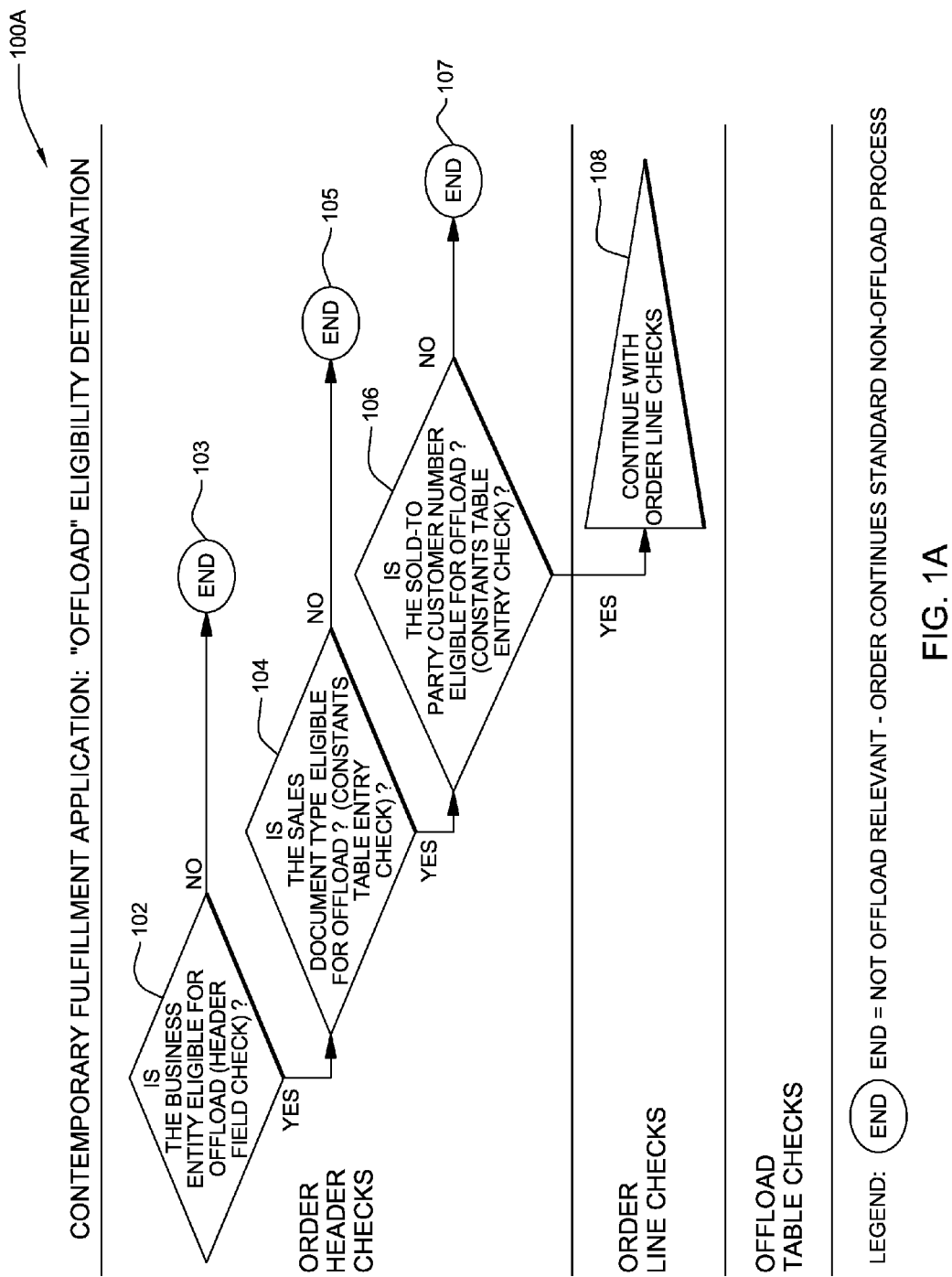

Many of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, include the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In a first aspect of the invention, there is provided a method of managing orders, in accordance with an embodiment of the invention. The method comprises determining, using a contemporary fulfillment application, whether an order of a plurality of orders is eligible for forwarding to a specific manufacturing site for fulfillment of the order, if the order is eligible for forwarding to the specific manufacturing site, sending a scheduling request message from the contemporary fulfillment application to a legacy scheduling application, the scheduling request message including a code recommending to the legacy scheduling application that the order is to be fulfilled by the specific manufacturing site, wherein the contemporary fulfillment application manages fulfillment of the order by the specific manufacturing site. Further, the method comprises returning, by the legacy scheduling application to the contemporary fulfillment application, a scheduling response message providing scheduling information for the order and confirming that the order is to be fulfilled by the specific manufacturing site via management by the contemporary fulfillment application, transmitting a shipment request message by the contemporary fulfillment application to a contemporary production application for routing delivery of the order to the specific manufacturing site for fulfillment of the order and receiving a shipment response message from the contemporary production application providing a delivery status of the order routed to the specific manufacturing site. In an embodiment, the determining step further comprises inspecting a header for the order to determine if the order is eligible for forwarding to the specific manufacturing site, conducting checks for each line item of one or more line items contained in the order to determine if the order is eligible for forwarding to the specific manufacturing site and checking whether a line item of the one or more line items contained in the order is stored in a table of one or more tables within the contemporary fulfillment application in order to process the order. In an embodiment, the sending step further comprises sending by the contemporary fulfillment application to a messaging application the scheduling request message having a first format native to the contemporary fulfillment application, reformatting by the messaging application the scheduling request message received from the contemporary fulfillment application having the first format into a scheduling request message having a second format native to the legacy scheduling application and forwarding the scheduling request message having the second format to the legacy scheduling application. In an embodiment, the returning step further comprises returning, by the legacy scheduling application, the scheduling response message having the second format, reformatting by the messaging application the scheduling response message having the second format into a scheduling response message having the first format and forwarding the scheduling response message having the second format to the contemporary fulfillment application. In an embodiment, the transmitting step further comprises generating, by the contemporary fulfillment application, a list of delivery due dates corresponding to a plurality of orders to be fulfilled by the manufacturing site, determining if a date is reached when materials for fulfilling the order are available at the specific manufacturing site and, if so, transmitting the shipment request message to the contemporary production application for routing to the specific manufacturing site for initiating shipment of the order. In an embodiment, the receiving step further comprises routing, by the contemporary production application, the shipment request message received from the contemporary fulfillment application to the specific manufacturing site and establishing, by the contemporary production application, a delivery status for the order fulfilled by the specific manufacturing site, wherein the delivery status comprises at least one of: complete shipment, partial shipment and no shipment. The method further comprises updating, by the contemporary fulfillment application, a table configured to track the delivery status of the order shipped from the specific manufacturing site. Further, the method comprises closing out, by the contemporary fulfillment application, a portion of the order in the shipment request that has been processed and pending closing of the order until the legacy scheduling application has conveyed shipment information pertaining to any portion of the order that has been routed to a manufacturing site determined by the legacy scheduling application.

Figure 1B:
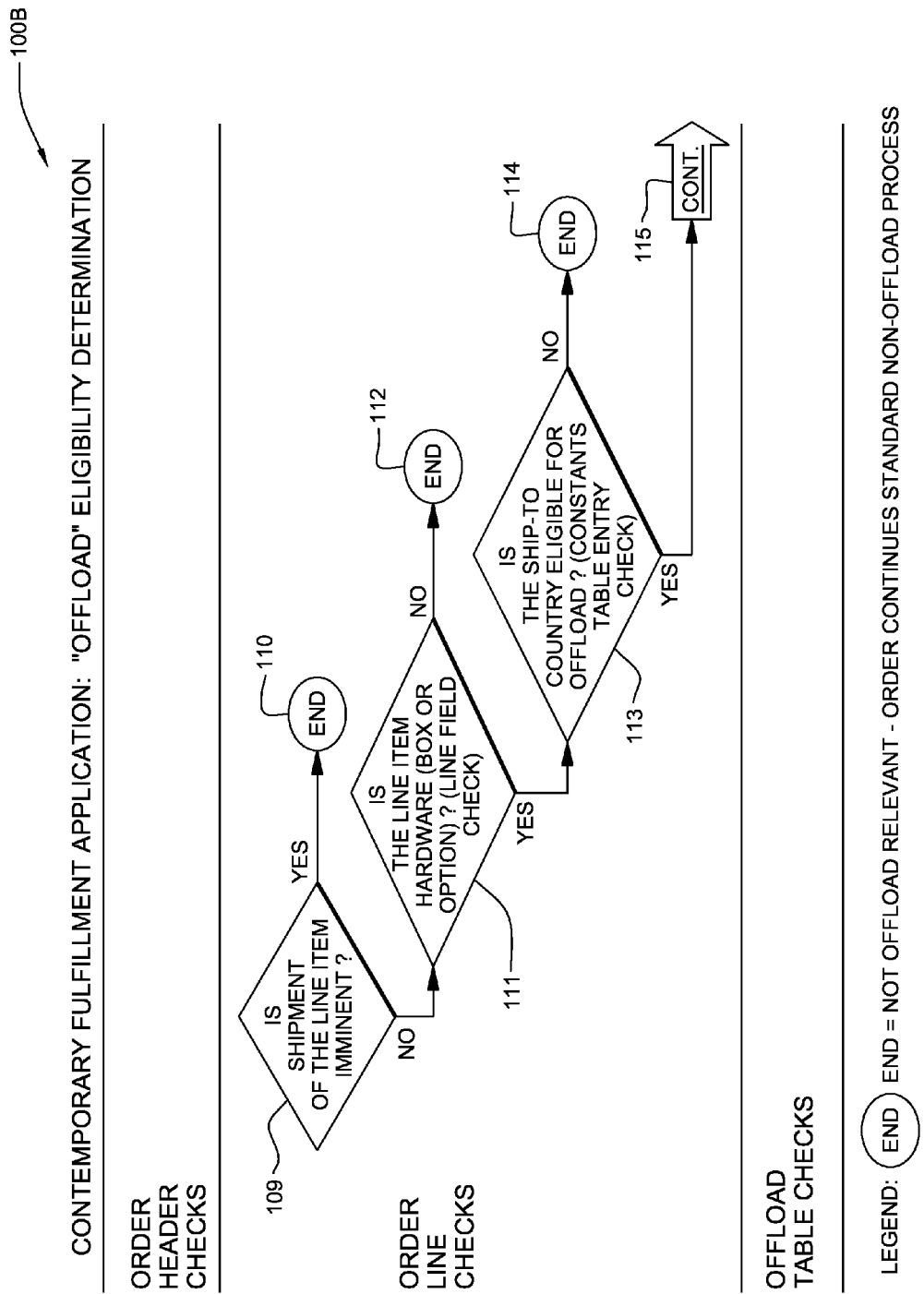
Figure 1C:
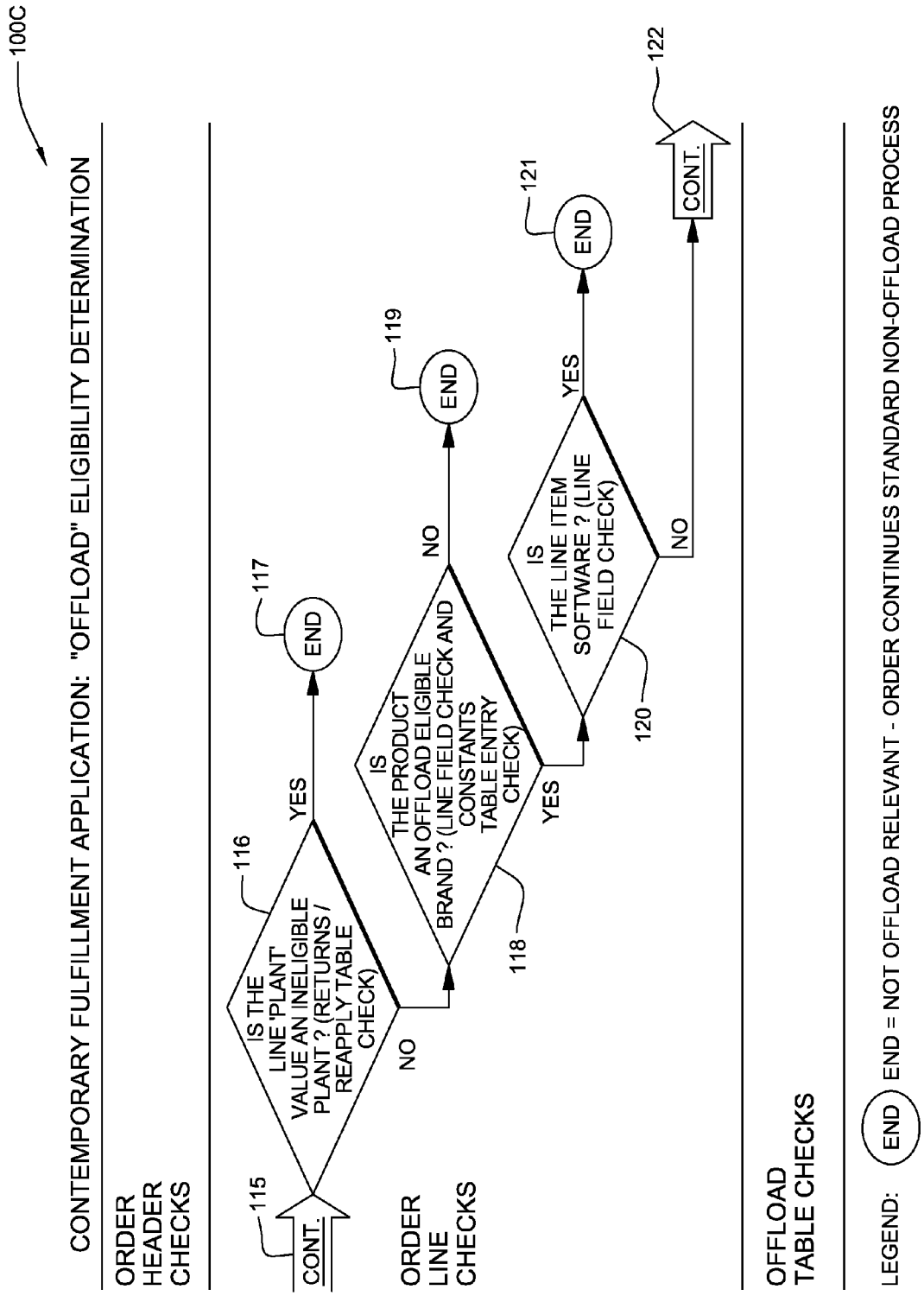
Figure 1D:
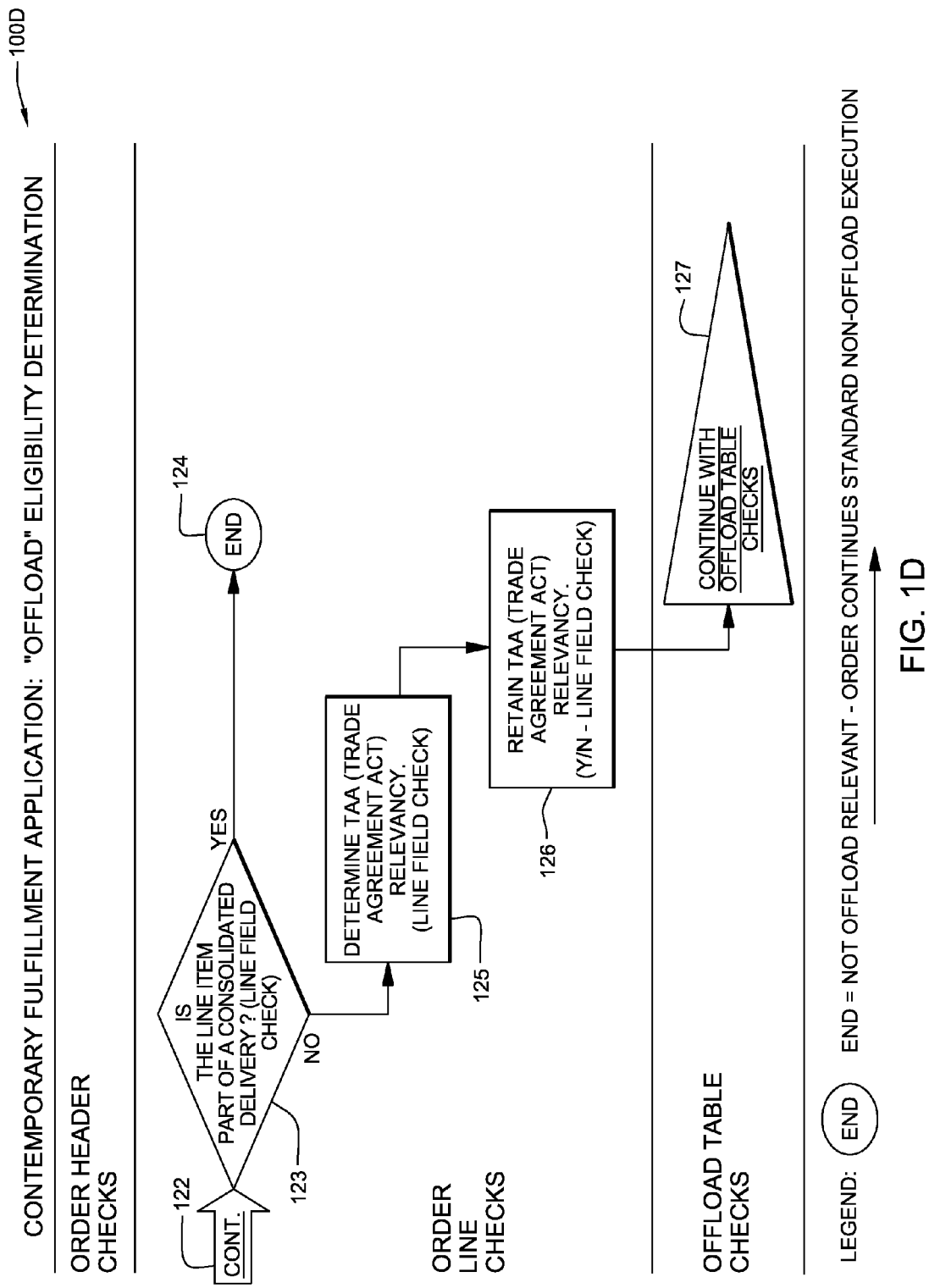

Reference is now made to FIGS. 1A through 1E, which together depict a method or process of determining eligibility of an order for offloading to a specific manufacturing site in order to optimize management of the order. As used herein, the term "offload" or "offloading" refers to the process carried out by a contemporary fulfillment application of managing or directing an order received to a specific or specific manufacturing site or plant for fulfillment of the order versus sending the order to a standard or regular manufacturing site or plant for fulfillment of the order. Also, as used herein, the term "contemporary" as in "contemporary fulfillment application" (also referred to herein as "order processing application" or "order fulfillment application" or simply as "first application") refers to the ability of an application that can accommodate any transformation, such as, a modification to the application that enhances functionality and/or improves communications with other applications for fulfilling an order. In an embodiment, the contemporary fulfillment application comprises an application used for fulfilling a customer order, for example, the SAP® R/3 software package application that is commercially available from the German software company, SAP Aktiengesellschaft. As shown in FIGS. 1A through 1E, the offload process carried out by the contemporary fulfillment application runs through various checks, such as, header checks, order line checks and table checks in order to decide whether or not to request routing of an order to a specific manufacturing site for fulfillment. Turning to FIG. 1A, reference numeral 100A outlines the header checks carried out by an offload processing tool or program deployed within the contemporary fulfillment application for determining if an order is eligible for offloading or routing to a specific manufacturing site or plant. In step 102, the offload processing tool determines whether the business entity provided in the order header is an entity that is eligible for the offload process. If the entity provided in the order header is determined by the offload processing tool to be not eligible, then the process ends at step 103. However, if the offload processing tool determines that the entity listed is eligible, then the offload processing tool determines in step 104 if the sales document type listed in the order header is eligible for the offload process. In an embodiment, the sales document type listed in the order header is used by the system to determine a manner in which the sales order is to be processed. If the offload processing tool determines that the sales document type is not eligible for offloading, then the process ends at step 105. However, if the offload processing tool determines that the sales document type listed is eligible, then the offload processing tool determines in step 106 if the sold-to-party customer number listed in the order header is eligible for the offload process. In an embodiment, the sold-to-party customer number listed in the order header is a numeric representation of the customer to whom the product is sold to. As such, the check is done against a table entry that lists the sold-to-party customer numbers that are eligible instead of checking against all data pertaining to the sold-to-party customer. If the offload processing tool determines that the sold-to-party customer number is not eligible for offloading, then the process ends at step 107. However, if the offload processing tool determines that the sold-to-party customer number listed is eligible, then the offload processing tool continues with order line checks (referenced by arrow 108) as shown in FIGS. 1B through 1D.

Turning to the offload process 100B outlined in FIG. 1B, the offload processing tool determines in step 109 whether or not shipment of the line item in the order is imminent. If it is determined that shipment of the order line item is imminent, then the process ends at step 110. However, if shipment of the order line item is not imminent, then the offload processing tool determines in step 111 whether or not the order line item pertains to hardware (either a hardware box or bundle or a hardware option. If the order line item does not pertain to hardware (that is either an option or a box/bundle), then the process ends at step 112, since only orders pertaining to hardware options and/or hardware bundles are eligible for the offloading process. If it is determined that the order line item is a hardware box/bundle or hardware option, then it is determined in step 113 whether or not the ship-to county is eligible for the offload process. If the ship-to county is not eligible for the offload process, then the process ends at step 114. However, if the ship-to county is eligible for offloading, the process continues (referenced by arrow 115) in FIG. 1C.

Turning to the process 100C outlined in FIG. 1C, the offload processing tool determines in step 116 whether or not the manufacturing site or plant value stated in the order is an ineligible plant. If the manufacturing plant value is ineligible, then the process ends at step 117. On the other hand, if the manufacturing plant value is not ineligible, then the offload processing tool determines in step 118 whether or not the product listed in the order line item is an offload eligible brand product. If the product is not an eligible brand, then the process ends at step 119. However, if the product is an eligible brand, then a determination is made in step 120 whether or not the order line item pertains to software. If the order line item pertains to software, then the process ends at step 121 and, if the order line item does not pertain to software, the process continues (referenced by arrow 122) in FIG. 1D. Turning to the process 100D outlined in FIG. 1D, the offload processing tool determines in step 123 whether or not the order line item is part of a consolidated delivery. If the order line item is part of a consolidated delivery, then the process ends at step 124. However, if the order line item is not part of a consolidated delivery, then the offload processing tool determines in step 125 whether or not the Trade Agreement Act (TAA) is relevant. If the Trade Agreement Act (TAA) is determined to be relevant, the offload processing tool retains or flags in step 126 the TAA relevancy for the order line item and the process continues with offload table checks (referenced by arrow 127) in FIG. 1E.

Turning to the process 100E outlined in FIG. 1E, the offload processing tool checks in step 128 whether or not the order line item matches an entry in a first table among a plurality of tables. If the order line item does not match an entry in the first table, the offload processing tool determines in step 129 whether or not the TAA (Trade Agreement Act) is relevant to the order line item. If the TAA is relevant, the process ends with step 130. However, if the TAA is not relevant to the order line item, then the offload processing tool checks in step 131 whether or not the order line item matches an entry in a second table among the plurality of tables. If the order line item does not match an entry in the second table, then the process ends with step 132. However, if the order line item matches an entry in the first table (step 128) or in the second table (step 131), then the process continues in step 134 with the contemporary fulfillment application sending a scheduling request to a legacy application, as described herein below with respect to FIGS. 2A through 2I.

Figure 2A:
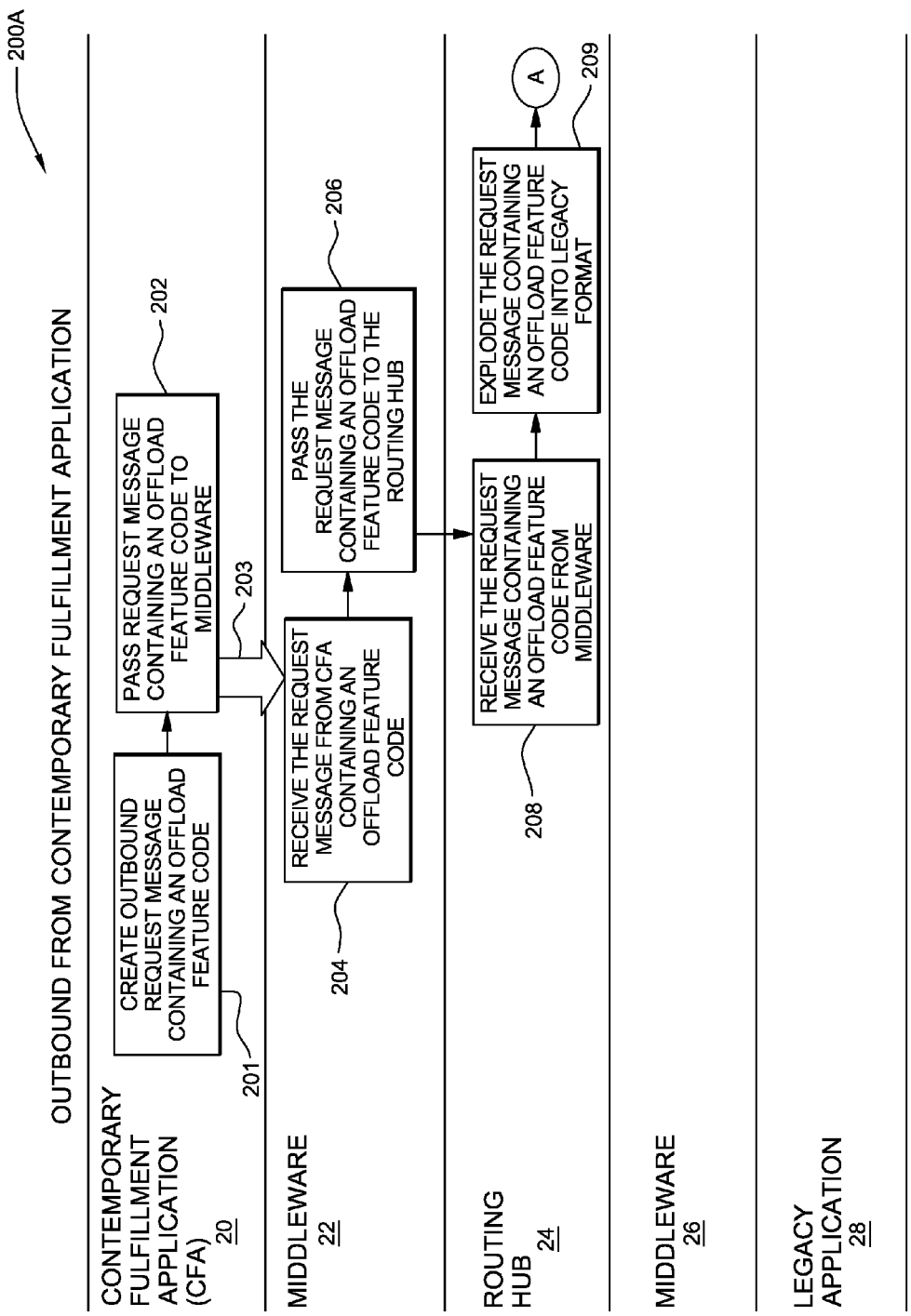
Figure 2B:
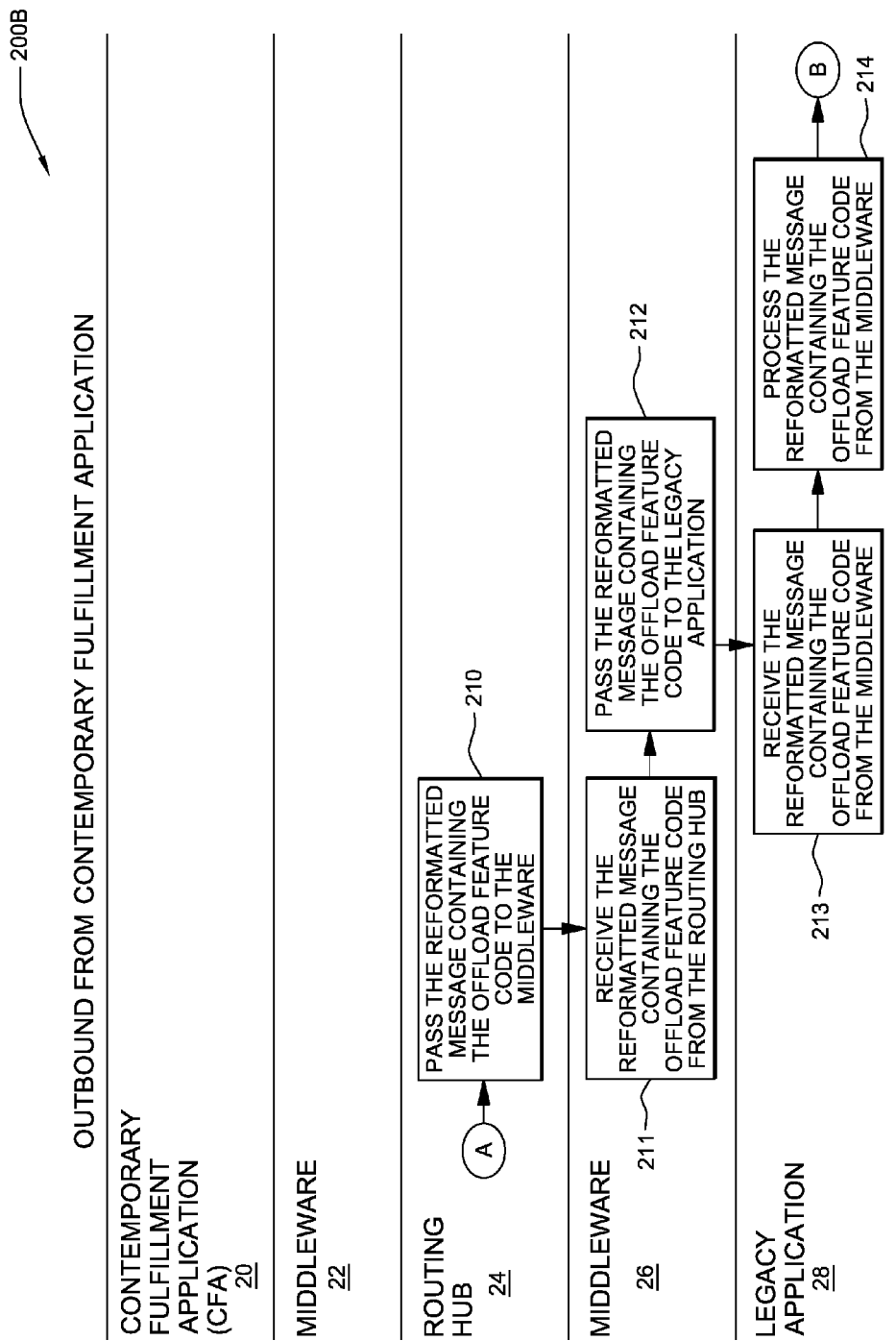

Reference is now made to FIGS. 2A through 2I, which together depict a scheduling process or method utilized by the contemporary fulfillment application 20 for optimizing management of an order. In particular, FIGS. 2A and 2B depict an outbound process from a contemporary fulfillment application 20 to a legacy application 28, whereas, FIGS. 2C through 2I depict an inbound process from a legacy application 28 to a contemporary fulfillment application 20. As used herein, the term "contemporary" as in "contemporary fulfillment application" refers to the ability of an application that can accommodate any transformation, such as, a modification to the application that enhances functionality and/or improves communications with other applications for fulfilling an order. On the other hand, the term "legacy" as in "legacy application" is any application that cannot easily accommodate transformation without posing problems. In an embodiment, the contemporary fulfillment application 20 comprises an application, that is used for fulfilling a customer order (also referred to herein as "order processing application" or "order fulfillment application" or simply as "first application"), for example, the SAP® R/3 software package application that is commercially available from the German software company, SAP Aktiengesellschaft. As used herein, the term "legacy" as in "legacy application" refers to any application that cannot easily accommodate transformation without posing problems. In an embodiment, the legacy application 28 comprises an application, for instance, any scheduling and sourcing application (also referred to herein as "scheduling-sourcing application" or simply as "second application") that is commercially available and may interface with a manufacturing application in order to schedule the order and for providing sourcing information for the order to the contemporary fulfillment application 20. In an embodiment, the legacy application 28 is the International Business Machines Corporation's Enterprise Order and Supply Execution application, however, other scheduling-sourcing applications may be used. It is understood that although the inventive method or process is described herein in terms of a contemporary order processing application (contemporary fulfillment application 20) and a legacy scheduling and sourcing application (legacy application 28), the method or process can be applied or used to optimize management of an order where product build requirements need to be communicated to different manufacturing systems that often utilize different process models, product nomenclatures and communication methods. Referring to reference numeral 200A of FIG. 2A, after a determination has been made by the contemporary fulfillment application 20 to offload the order, the contemporary fulfillment application 20 creates in step 201 a request message (or a communication request), which is created in a first format native to the contemporary fulfillment application. The request message is sent from the contemporary fulfillment application 20 to the legacy application 28 for scheduling shipment and sourcing of the order. In an embodiment, the order scheduling request message is created using the SAP® R/3 software application 20, which creates the order scheduling request message having a condensed or compressed IDoc (Intermediate Document) message format. The IDoc message comprises of three elements, namely, the header, a data segment and a status record. The header contains administrative data for technical processing, whereas, the status record provides the processing status of the IDoc message at a given point-in-time. Further, the data segment contains the application data which is stored in segments, where each segment is a collection of related data that is to be passed to an external system, for instance, the legacy application 28. In particular, in step 201, the SAP® R/3 software application or contemporary fulfillment application 20 creates a condensed IDoc message that contains an offload feature code, which recommends or signifies to the legacy application 28 that the order is to be fulfilled by a specific manufacturing site that uses a manufacturing system that the legacy application cannot communicate with. Although, the message format is described herein in terms of an IDoc format that is inherent to the SAP® R/3 software application, it is understood that another contemporary or first application used for a different business purpose may create an enhanced request message in a different format so that it may optimize management of the order communicated to a manufacturing site. In step 202, the contemporary application or SAP® R/3 software application 20 passes the condensed message (in the IDoc format) to a message-oriented middleware 22 via link 203. In an embodiment, the middleware 22 comprises a message-oriented middleware used for program-to-program messaging across multiple platforms, for instance, IBM's Websphere MQ software, commercially available from International Business Machines (IBM) Corporation. Again, any other suitable middleware may be used for middleware 22. The middleware 22 receives in step 204, the condensed IDoc request message from the SAP® R/3 software application 20, which contains the offload feature code. In an embodiment, the IDoc request message created in the SAP® R/3 software application is sent via a link 203, for instance, the SAP® R/3 link, where R/3 refers to real time having three tiers, namely, presentation, application, and database. Accordingly, the order information is passed in real time to the middleware 22. However, it is understood that any other suitable link 203 may be used depending on the type of contemporary application being used. The middleware 22 passes in step 206 the condensed IDoc request message containing the offload feature code to a routing hub or transaction hub application 24. In an embodiment, the routing hub application 24 comprises any routing application that is commercially available in the market place. The transaction hub or routing hub application 24 receives the condensed IDoc request message from the middleware 22 in step 208. In an embodiment, the routing hub application 24 reformats in step 209 the condensed IDoc request message received into a second format or legacy format native to the legacy application 28, that is, the routing hub application 24 reformats the condensed IDoc request message containing the offload feature code into an expanded format or an exploded request message (second format or legacy format), so that the legacy application 28 can read the data contained in the IDoc request message. The method or process then continues (referenced by the arrow having an "A" in a circle) in FIG. 2B with step 210.

As shown in reference numeral 200B of FIG. 2B, the routing hub application 24 passes in step 210 the reformatted or expanded request message in the second or legacy format containing the offload feature code to the middleware 26. In an embodiment, the middleware 26 comprises a message-oriented middleware used for program-to-program messaging across multiple platforms, for instance, the Websphere MQ software, commercially available from International Business Machines (IBM) Corporation. Again, any other suitable middleware may be used for middleware 26. Further, in an embodiment, the middleware 22 may be from a different vendor than the middleware 26. The middleware 26 receives in step 211 the reformatted request message or expanded request message (or second format) from the routing hub application 24 and passes the reformatted request message to the legacy application 28 in step 212. The legacy application 28 receives in step 213 the reformatted or expanded request message in the legacy format containing the offload feature code from the middleware 26 and processes the reformatted or expanded request message in the legacy format received from the middleware 26 in step 214. The method or process then continues (referenced by the arrow having a "B" in a circle) in FIG. 2C in step 216.

Turning to FIG. 2C, reference numeral 200C outlines the inbound communication process between the legacy application 28 and the routing hub application 24. After the legacy application 28 processes the reformatted or expanded request message in the legacy format received from the middleware 26 (in steps 213 and 214 in FIG. 2B), the legacy application 28 schedules and sources in step 216 the order as per the source of supply defined by the offload feature code. In particular, in step 218, the legacy application 28 creates in step 216 a scheduling response message (also referred to as offload source of supply/scheduling message) designating a manufacturing source for fulfilling the order as defined or set forth in the request message received containing the offload feature code. In an embodiment, the scheduling and source response message identifying the defined offload source of supply is created in a second format or a legacy format native to the legacy application 28. The legacy application 28 passes or forwards or sends in step 219 the scheduling response message created to the middleware 26. The middleware 26 receives from the legacy application 28 in step 220 the scheduling and source response message identifying the manufacturing source and passes in step 221 the scheduling and source response message received to the routing hub application 24. The routing hub application 24 receives from the middleware 26 in step 222 the scheduling and source response message containing the offload source of supply or offload manufacturing source in the legacy format (or second format). The method or process then continues (referenced by the arrow having a "C" in a circle) in FIG. 2D with step 223.

Figure 2D:
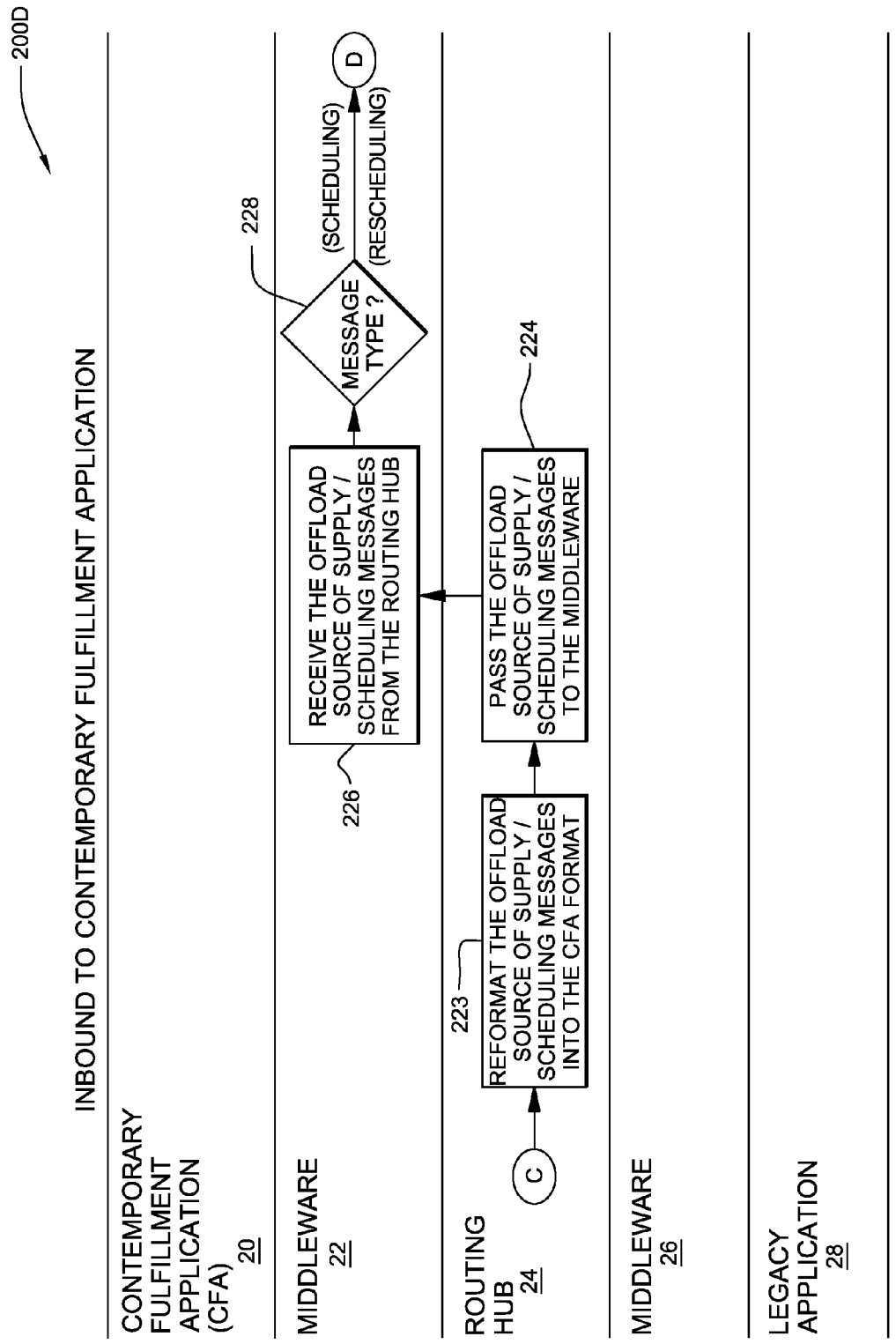

Turning to FIG. 2D, reference numeral 200D outlines the inbound communication process between the routing hub application 24 and the middleware 22. As shown in FIG. 2D, the routing hub application 24 reformats in step 223 the scheduling and source response message received from the legacy application 28 via the middleware 26. In particular, the routing hub application 24 reformats the scheduling and source response message received in the legacy format into a first format, namely, a contemporary format that is native to or understood by the contemporary application, such as, a format understood by the SAP® R/3 software application 20. Further, the routing hub application 24 passes or routes in step 224 the reformatted scheduling and sourcing response message to the middleware 22. The middleware 22 receives in step 226 the reformatted scheduling and sourcing response message in the first format or contemporary format and determines in step 228 the message type, namely, whether the scheduling response message is a new scheduling response message or a rescheduling response message. The method or process then continues (referenced by the arrow having a "D" in a circle) in FIG. 2E with step 229.

Figure 2E:
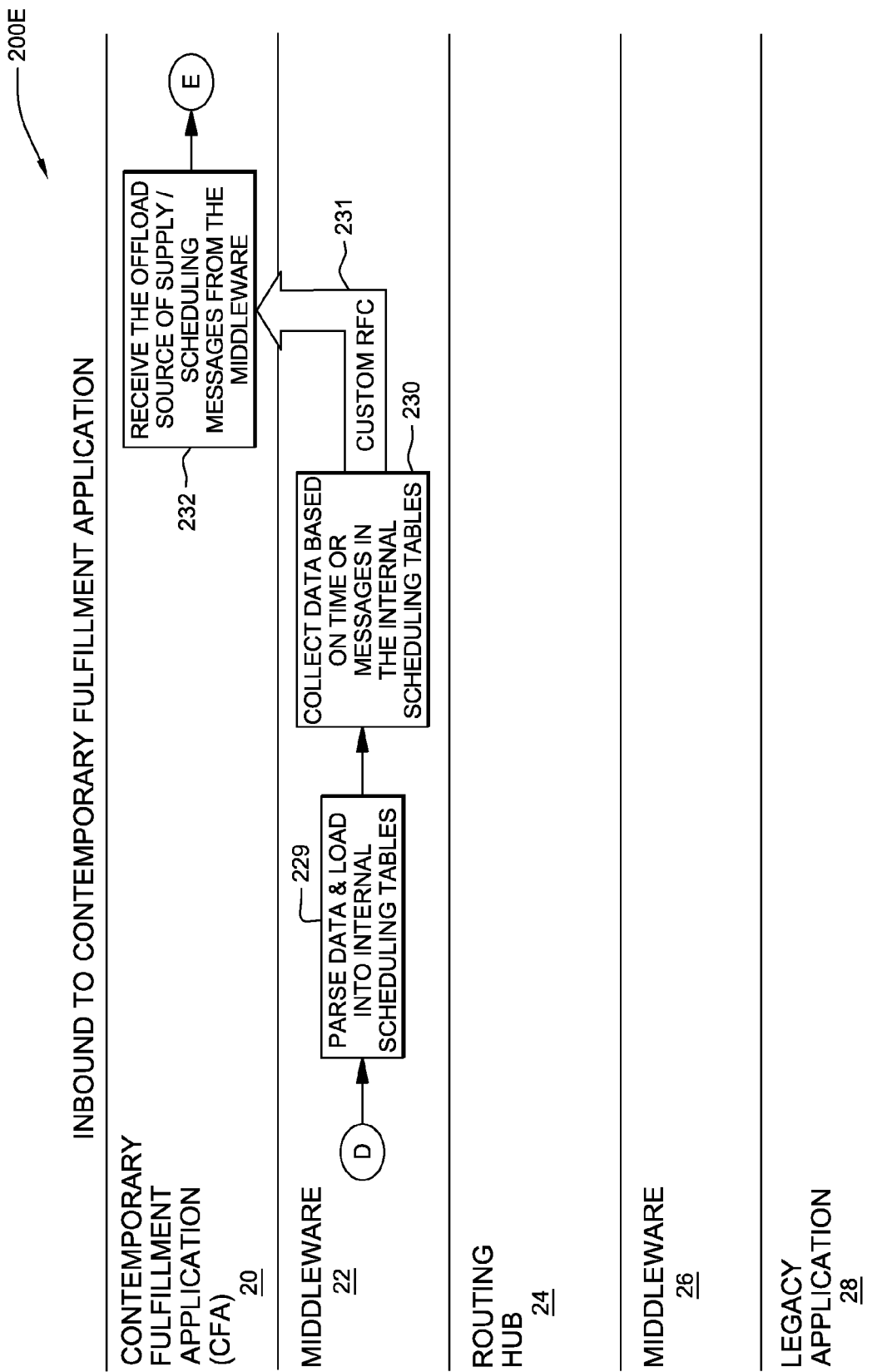

Turning to FIG. 2E, reference numeral 200E outlines the inbound communication process between the middleware 22 and the contemporary fulfillment application 20, for instance, the SAP® R/3 software application. As shown in step 229 of FIG. 2E, the middleware 22 parses the data contained in the scheduling and sourcing response message and loads or stores the parsed data temporarily into one or more internal scheduling tables in the middleware 22. Further, in an embodiment, the middleware 22 continues to collect and group in step 230 data contained in the scheduling and sourcing response messages received from the routing hub application 24 either based on a pre-determined collection criterion, such as, a pre-determined/preset time interval, for instance, every minute or every 2 minutes, etc. or based on a pre-determined/preset number or threshold of scheduling and sourcing response messages received and collected, for instance, collecting data until 100 scheduling response messages have been collected or 1000 scheduling and sourcing response messages have been collected within the one or more internal scheduling tables. As such, the middleware 22 collects data contained in each scheduling and sourcing response message received either until the pre-determined time interval has elapsed or until the middleware 22 has reached the preset or pre-determined number of scheduling and sourcing response messages. The data collected in step 230 is stored or loaded as a collection or group in the internal scheduling table(s) within the middleware 22 on a temporary basis until the pre-determined time interval or the pre-set number of scheduling messages has been reached, which then triggers the invoking of a RFC (Remote Function Call) for sending the scheduling and sourcing data to the contemporary fulfillment application 20, for instance, the SAP® R/3 software application. In an embodiment, the middleware 22 stores or loads the data collected for the collection or group of scheduling messages in a flat file format within the scheduling table within the middleware 22. Thus, upon reaching either the pre-determined time interval or the pre-determined number of scheduling and sourcing response messages in step 230, the middleware 22 invokes a custom remote function call (RFC) in step 231 for calling or invoking an appropriate function module within the contemporary fulfillment application or SAP® R/3 software application 20 for processing the collection or group of scheduling and sourcing response messages. The contemporary or SAP® R/3 software application 20 receives in step 232 the scheduling and sourcing response messages as a collection or group from the middleware 22 and the method or process continues (referenced by the arrow having a "E" in a circle) in FIG. 2F with step 233.

Figure 2F:
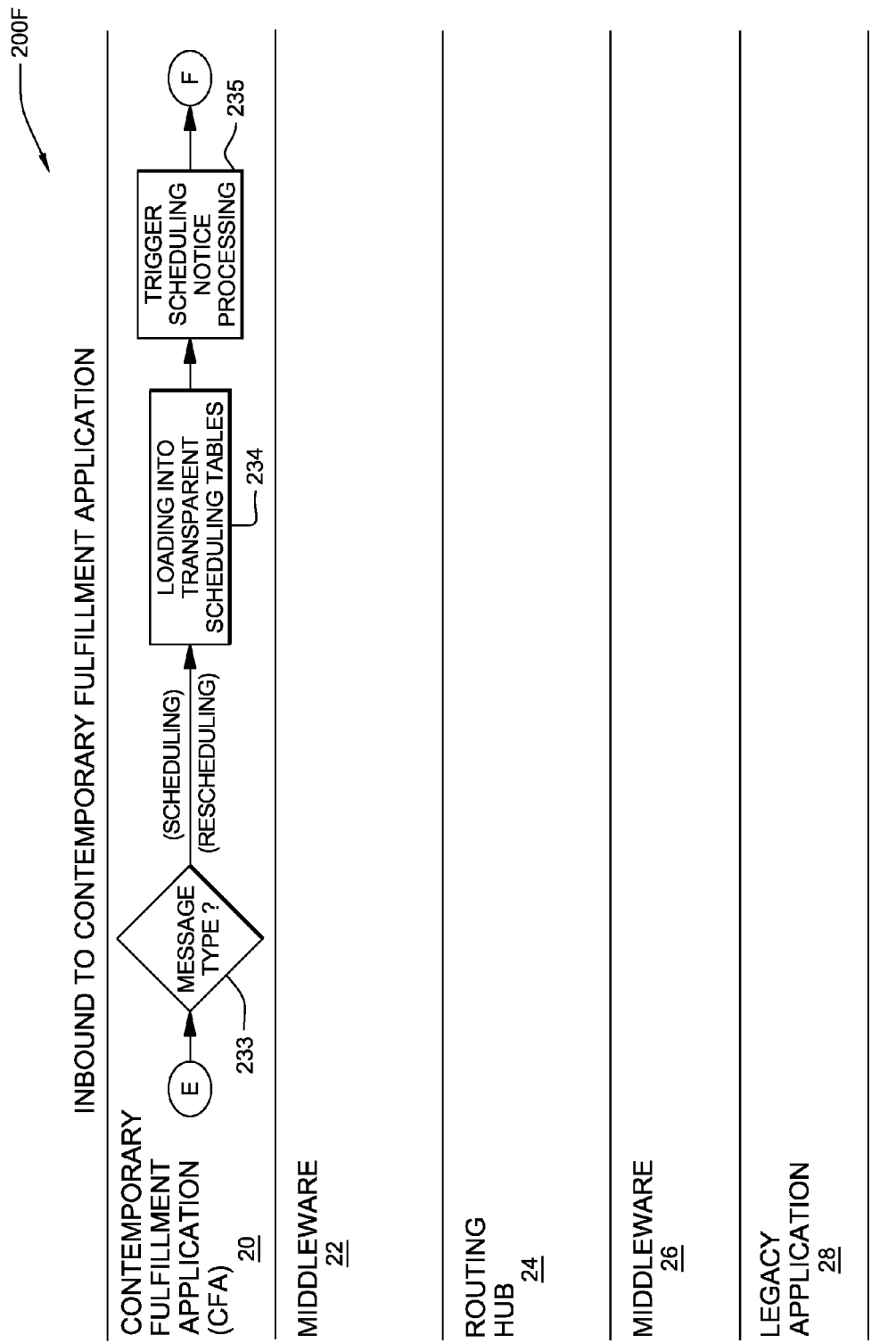

Turning to FIG. 2F, reference numeral 200F outlines the inbound processing function carried out by the contemporary fulfillment application 20, for instance, the SAP R/3 software application used for processing the scheduling and sourcing data or information contained in the scheduling and sourcing response message received in step 232 (of FIG. 2E). As shown in FIG. 2F, in step 233, the contemporary fulfillment application 20 or SAP® R/3 software application determines the message type of the collection of response messages received in step 232 (shown in FIG. 2E) from the middleware 22. In an embodiment, the contemporary application determines the message type in step 232 based upon the message type value contained within a file that is received. If the collection of response messages received in step 232 (in FIG. 2E) is determined in step 202 by the contemporary fulfillment application 20 to be scheduling response messages, regardless of whether a message pertains to a new or an initial scheduling response message or an updated scheduling or rescheduling response message, the contemporary fulfillment application 20 loads in step 234 the data contained in the collection of scheduling response messages into an internal scheduling or transparent scheduling table within the contemporary fulfillment application 20 or SAP® R/3 software application. Further, the loading of the data into the scheduling table triggers in step 235 the scheduling notice processing of the scheduling messages within the contemporary fulfillment application 20. In particular, the contemporary fulfillment application 20 further groups all the scheduling response messages according to pre-determined processing criteria, such as, message type (that is, whether initial scheduling messages or rescheduling messages), date, time, order number, etc. As such, all the initial scheduling response messages are grouped together according to date, time, order number, etc., whereas, all the rescheduling response messages are grouped together according to date, time, order number, etc. Furthermore, the contemporary fulfillment application 20 uses the processing criteria (date, time, order number, etc.) contained in both the initial scheduling response message group and the rescheduling response message group to discard any duplicate response messages in either of the initial scheduling and rescheduling groups, thus, maximizing efficiency by reducing the amount of data that is processed, as well as reducing the amount of time spent in processing any duplicate initial and rescheduling response messages. After the contemporary fulfillment application 20 has processed the initial and rescheduling response messages, the method or process continues (referenced by the arrow having a "F" in a circle) in FIG. 2G with step 236.

Figure 2G:
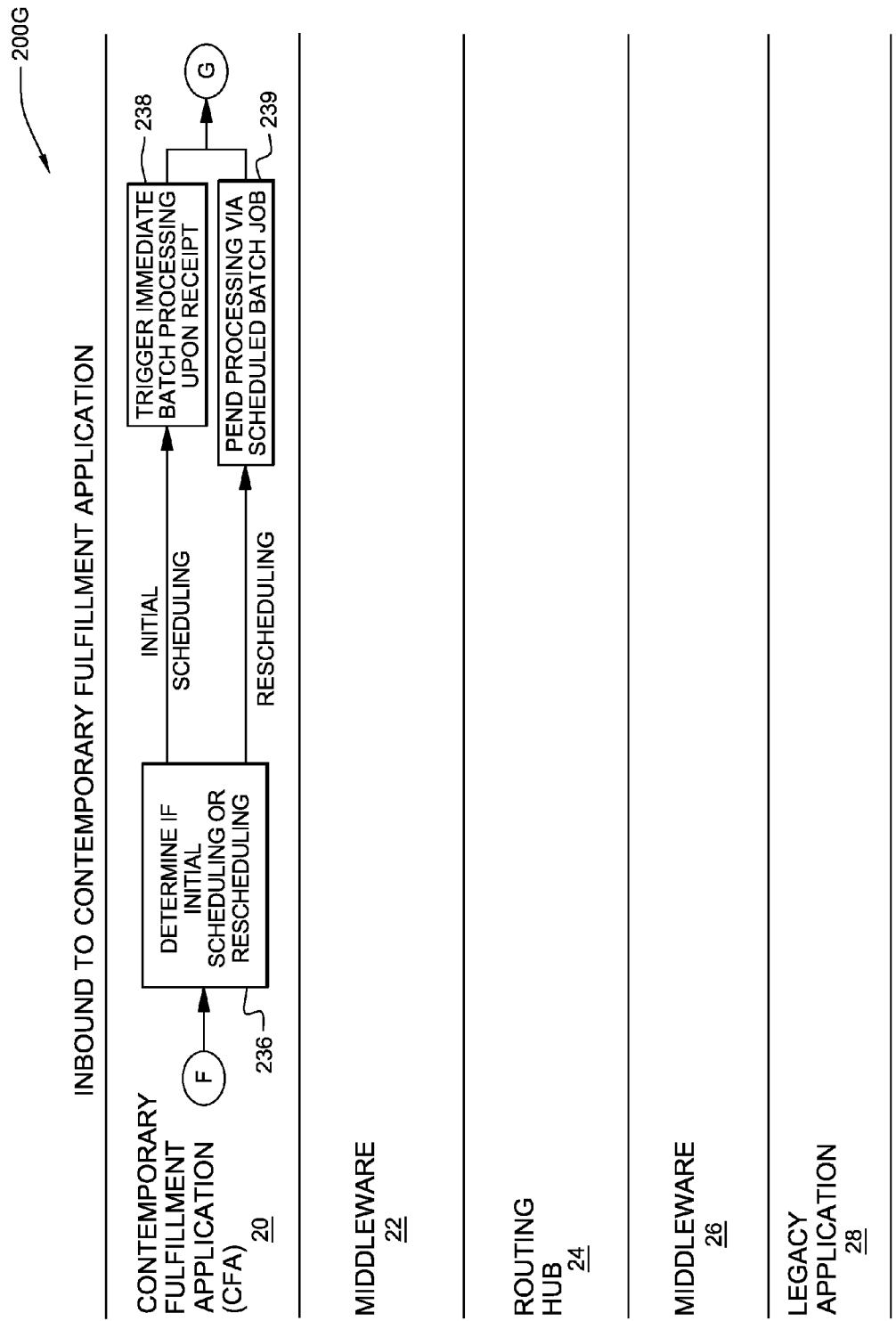

Turning to FIG. 2G, reference numeral 200G outlines the inbound processing function carried out by the contemporary application, for instance, the SAP® R/3 software application when the message type for the collection of response messages received is determined to be a scheduling response message type. As shown in FIG. 2G, in step 236, the contemporary fulfillment application 20 or SAP® R/3 software application further determines if the group or collection of scheduling response messages received pertain to initial or new scheduling response messages, which gets processed in batch mode immediately or whether the group or collection of scheduling response message received pertain to updated or rescheduling response messages, which get processed in extended batch mode, that is, via a scheduled batch job. In an embodiment, the contemporary application 20 determines the message type for the scheduling response based upon the message type value contained within a file that is received. As such, if the contemporary fulfillment application 20 or SAP® R/3 software application determines in step 236 that the group or collection of scheduling response messages pertains to new or initial scheduling response messages, then in step 238, the contemporary fulfillment application 20 or SAP® R/3 software application triggers immediate batch processing upon receipt of the new scheduling response messages. However, if in step 236, the contemporary fulfillment application 20 or SAP® R/3 software application determines that the group or collection of scheduling response messages pertain to updated or rescheduling response messages, then in step 239 the SAP® R/3 software application 20 pends or postpones processing of the rescheduling response messages via a scheduled batch job and the method or process continues (referenced by the arrow having a "G" in a circle) in FIG. 2H with step 240.

Figure 2H:
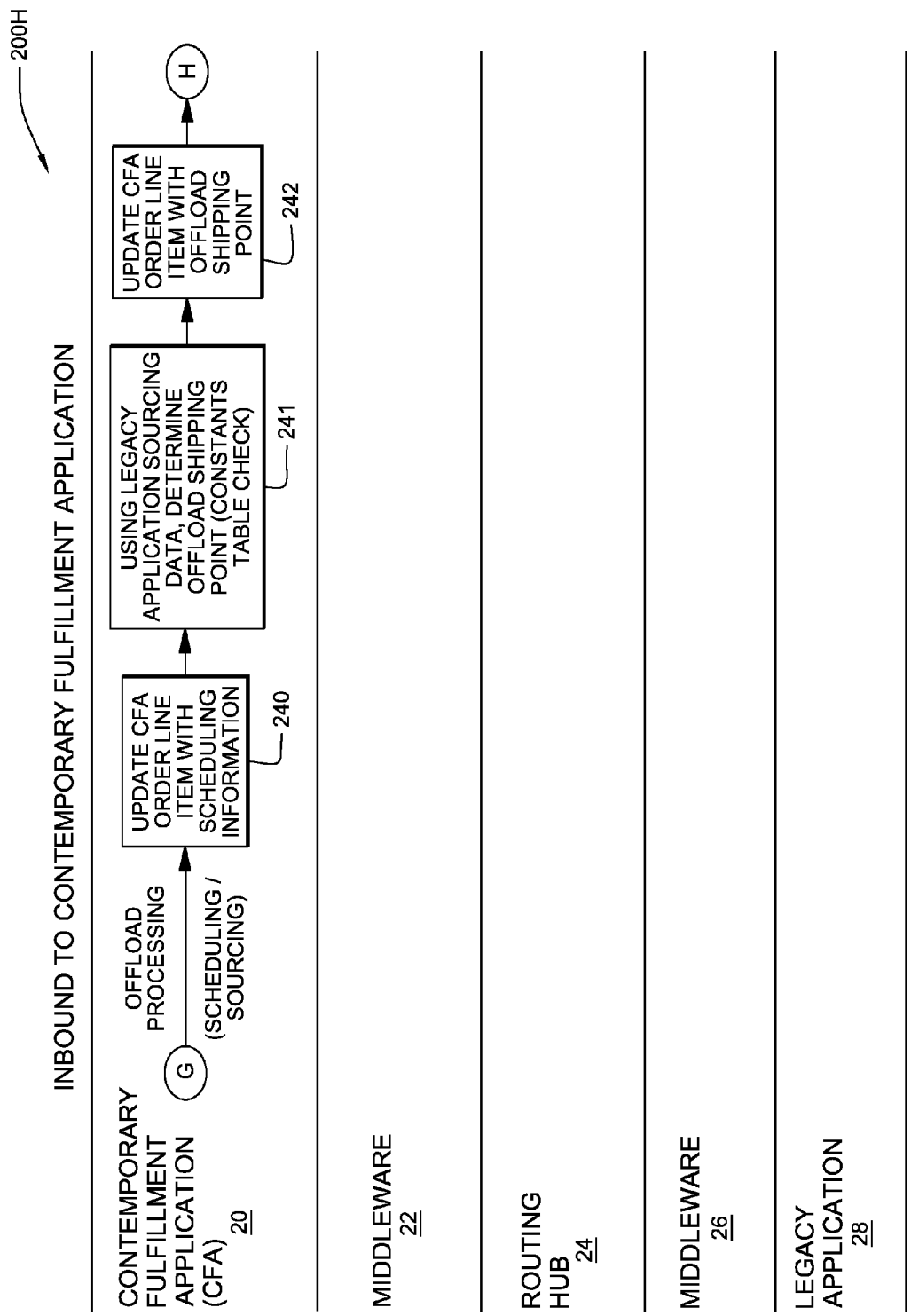
Figure 21:
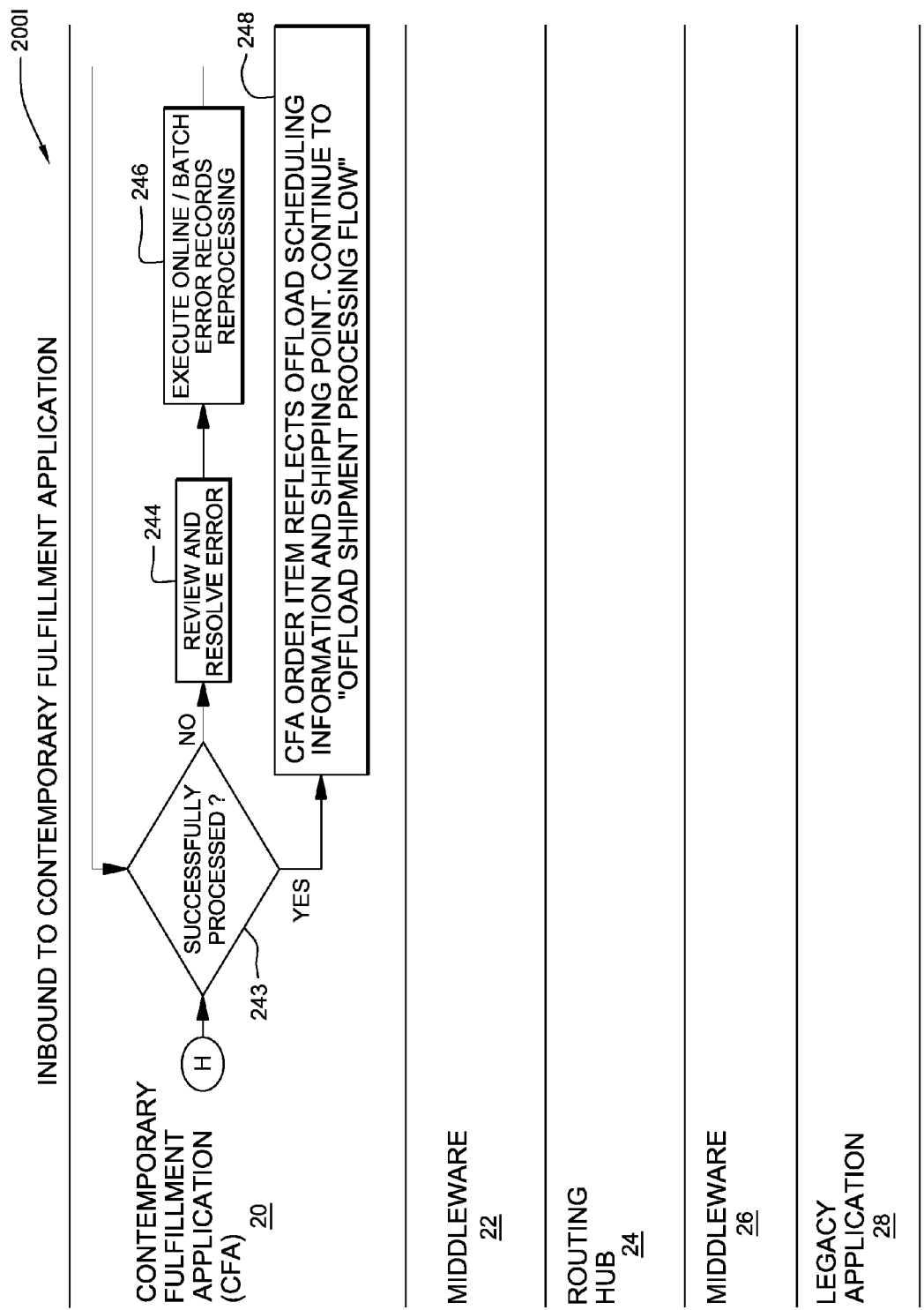

Referring to FIG. 2H, reference numeral 200H outlines the processing of scheduling and sourcing response messages that contain an offload feature code. In particular, if the scheduling and sourcing response messages contain an offload feature code, then in step 240 of FIG. 2H, the contemporary fulfillment application 20 updates the order line item with the appropriate scheduling and sourcing information contained in the response message. In step 241, the contemporary fulfillment application 20 uses the legacy application sourcing data corresponding to a manufacturing site by the offload feature code and determines an offload shipping point corresponding to the manufacturing site. The contemporary fulfillment application updates in step 242 the order line item with the offload shipping point determined in step 241 and after the scheduling and sourcing information has been updated, the process continues (referenced by the arrow having a "H" in a circle) in FIG. 2I with step 243.

Turning to FIG. 2I, reference numeral 200I outlines the error checking process for the inbound processing function carried out by the contemporary fulfillment application 20, namely, the SAP® R/3 software application, after a group of response messages (scheduling and sourcing response messages) have been processed. As shown in FIG. 2I, in step 243, the contemporary fulfillment application 20 (or SAP® R/3 software application) determines in step 243 whether the group of messages (either the scheduling messages from steps 238 and 239 in FIG. 2G containing the offload feature code and as processed in FIG. 2H) were processed successfully. In particular, if a record (corresponding to a response message) in a table fails during processing, certain fields are updated in the contemporary fulfillment application to indicate the specific error and the status of the error. If it is determined that the messages were processed successfully, then the process ends at step 248, with the offload shipment process continuing with the contemporary fulfillment application 20 communicating the offload order information received from the legacy application 28 to a contemporary production application, as discussed herein below with respect to FIGS. 3A through 3L. However, if the contemporary fulfillment application 20 determines in step 243 that the messages were not successfully processed, then the contemporary fulfillment application 20 (or SAP® R/3 software application) reviews in step 244 the error(s) found and, further, resolves the error(s) in step 244. Furthermore, the contemporary fulfillment application 20 (SAP® R/3 software application) executes in step 246 either an online re-processing of the data records or messages shown to have processing error(s) in step 244, that is, the contemporary fulfillment application 20 executes re-processing of the messages that were not processed successfully the first time around) or executes a batch error records reprocessing of the records or messages at a scheduled time. Additionally, the contemporary fulfillment application 20 repeats steps 243 through 246, until all messages with error(s) have been successfully processed. After all the messages with error(s) have been successfully processed, the contemporary fulfillment application 20 offloads the scheduling information and shipping point information reflected in the line order item to the contemporary production application in step 248, which processes shipment of the order, as discussed herein below with respect to FIGS. 3A through 3L.

Figure 3A:
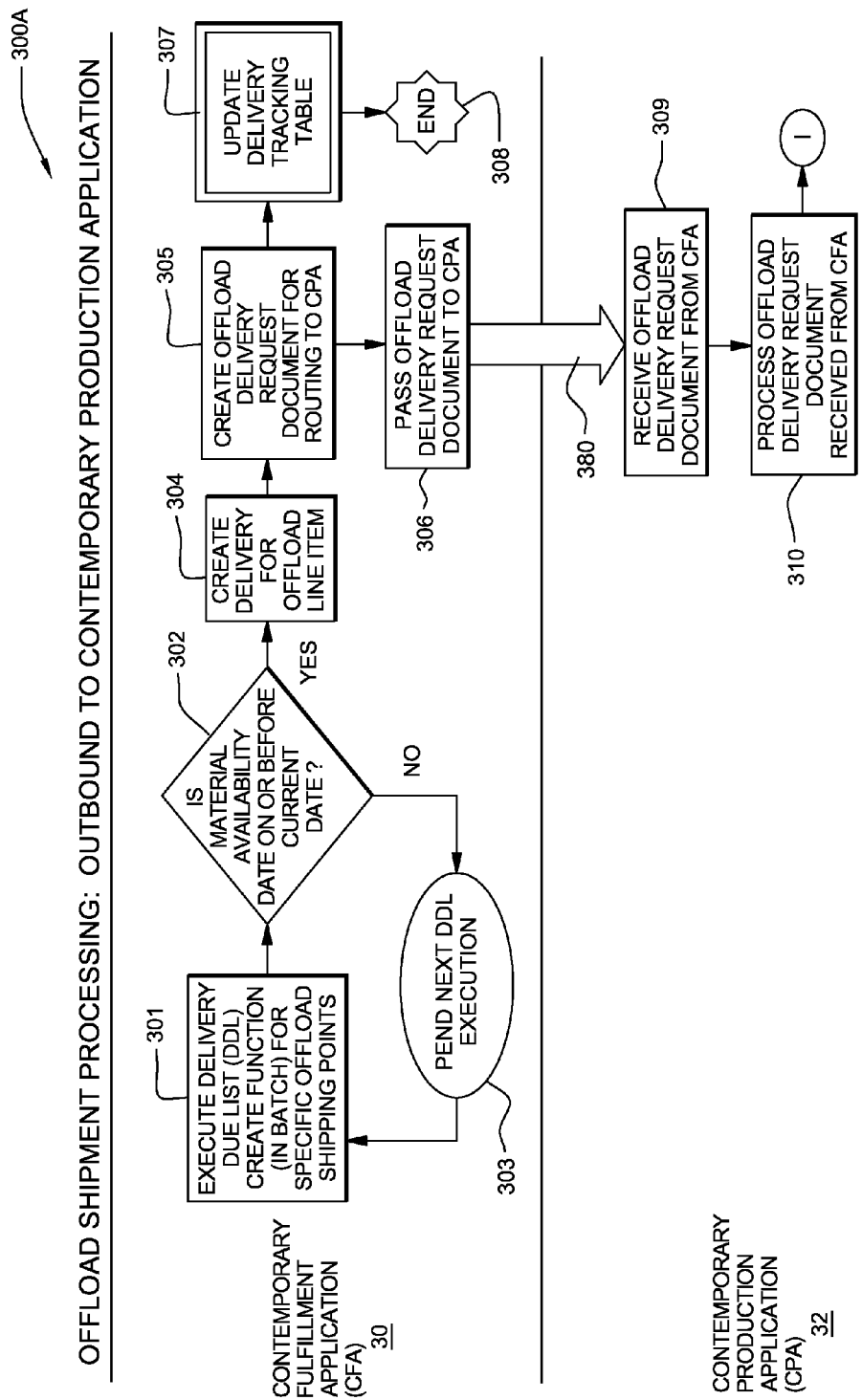
FIGS. 3A-3L illustrate an offload shipment processing of an order sent from the contemporary fulfillment application to a contemporary production application for optimizing management of an order, in accordance with an embodiment of the invention.

Reference is now made to FIGS. 3A through 3L, which together depict an offload shipment processing of an order sent from the contemporary fulfillment application to a contemporary production application, in accordance with an embodiment of the invention. In an embodiment, the offload shipment processing of an order is sent from a contemporary fulfillment application, such as, the SAP® R/3 software application to a contemporary production application, such as, another SAP® production application commercially available from the German software company, SAP Aktiengesellschaft. Since both the contemporary fulfillment application and the contemporary production application are contemporary applications, these applications have the ability to accommodate any transformations, such as, any modifications that enhance functionality and/or improve communication with other applications utilized for fulfilling an order. Turning to FIG. 3A, 300A depicts an outbound process from a contemporary fulfillment application (CFA) 30 to a contemporary production application (CPA) 32. In step 301, the offload processing tool utilized by the contemporary fulfillment application 30 executes a Delivery Due List (DDL) for specific offload shipping points corresponding to specific manufacturing sites or plants from where orders are to be shipped or fulfilled. A determination is made by the offload processing tool in step 302 as to whether the current date is on or before the material availability date. If the material availability date is not on or before the current date, then the offload processing tool pends the shipment process in step 303 and returns to step 301 until the next DDL (Delivery Due List) is run. However, if the current date is on or before the material availability date, then the offload processing tool creates in step 304 a Delivery for the offload line item. In step 305, the offload processing tool creates an offload Delivery request message (in an embodiment, the Delivery request message is in an IDoc format) for routing to the CPA (contemporary production application) 32. Further, the offload processing tool passes or transmits in step 306 the offload delivery request document (IDoc) to the contemporary production application (CPA) using a suitable communications link 380, such as, a standard SAP® application link enabler if using the SAP® software for both the contemporary order fulfillment and the contemporary production applications. In addition, the offload processing tool updates in step 307 a delivery tracking table maintained within the contemporary fulfillment application 30, ending the process at step 308. The contemporary production application (CPA) 32 receives in step 309 the delivery request document (IDoc) passed from the contemporary fulfillment application 30 and processes in step 310 the offload delivery request document (IDoc) received from the contemporary fulfillment application 30 in order to ship the order. The shipment process continues (referenced by the arrow having an "I" in a circle) in FIG. 3B with step 311.

Figure 3B:
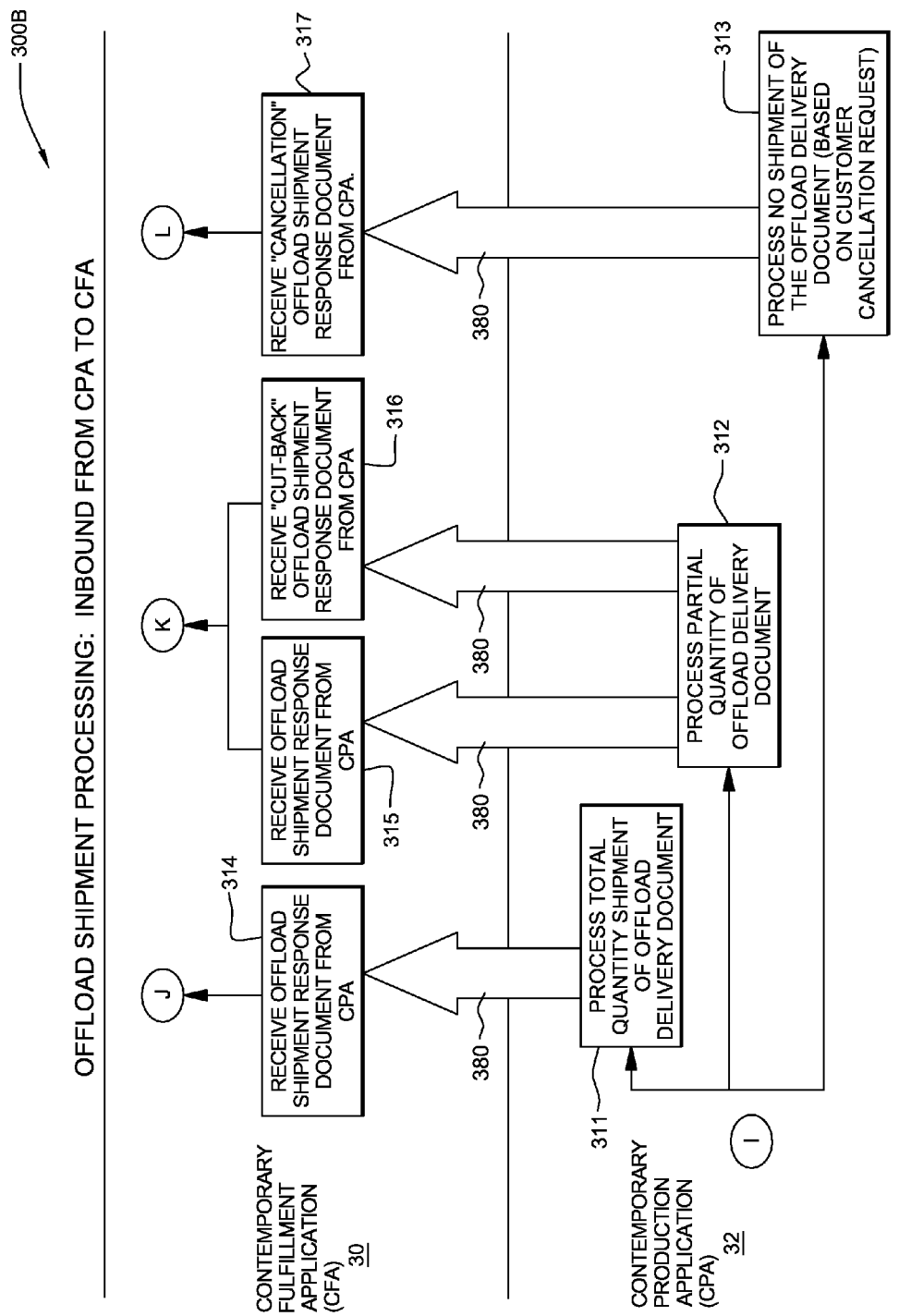

Turning to FIG. 3B, 300B depicts an overall inbound shipment process from a contemporary production application (CPA) 32 to a contemporary fulfillment application (CFA) 30. In step 311, the CPA 32 receives the offload delivery request document (IDoc) and determines whether the total quantity stated in the offload delivery request document (IDoc) is to be shipped (step 311) or whether only a partial quantity stated in the offload delivery request document (IDoc) is to be shipped (step 312). Further, the contemporary production application 32 also determines whether the total quantity stated in the offload delivery request document (IDoc) is to be canceled completely (step 313) based on a customer cancellation request (step 311), thus, resulting in no shipment of any of the order line items. If in step 311, the CPA 32 determines that the total quantity stated in the offload delivery request document (IDoc) is to be shipped, then the contemporary production application 32 sends via a communications link 380 an offload shipment response document (in an embodiment, in an IDoc format) to the contemporary fulfillment application (CFA) 30, which is received by the CFA 30 in step 314. The total shipment process continues (referenced by the arrow having a "J" in a circle) in FIG. 3C with step 318. Further, if in step 312, the CPA 32 determines that only a partial quantity stated in the offload Delivery IDoc is to be shipped, then the contemporary production application 32 sends via a communications link 380 an offload shipment response IDoc to the contemporary fulfillment application (CFA) 30, which is received by the CFA 30 in step 315 and, further, the contemporary fulfillment application 30 also receives (in step 316) a cut-back offload shipment response IDoc (reflecting the partial quantity to be shipped) from the CPA 32. The partial shipment process of the order is continued (referenced by the arrow having a "K" in a circle) in FIG. 3D with step 323. Moreover, in step 313, if the CPA 32 determines that the total quantity stated in the offload Delivery IDoc is to be cancelled or not shipped, then the contemporary production application 32 sends via a communications link 380 a cancellation offload shipment response IDoc to the contemporary fulfillment application (CFA) 30, which is received by the CFA 30 in step 317. The total cancellation of the shipment process continues (referenced by the arrow having an "L" in a circle) in FIG. 3E with step 332.

Figure 3C:
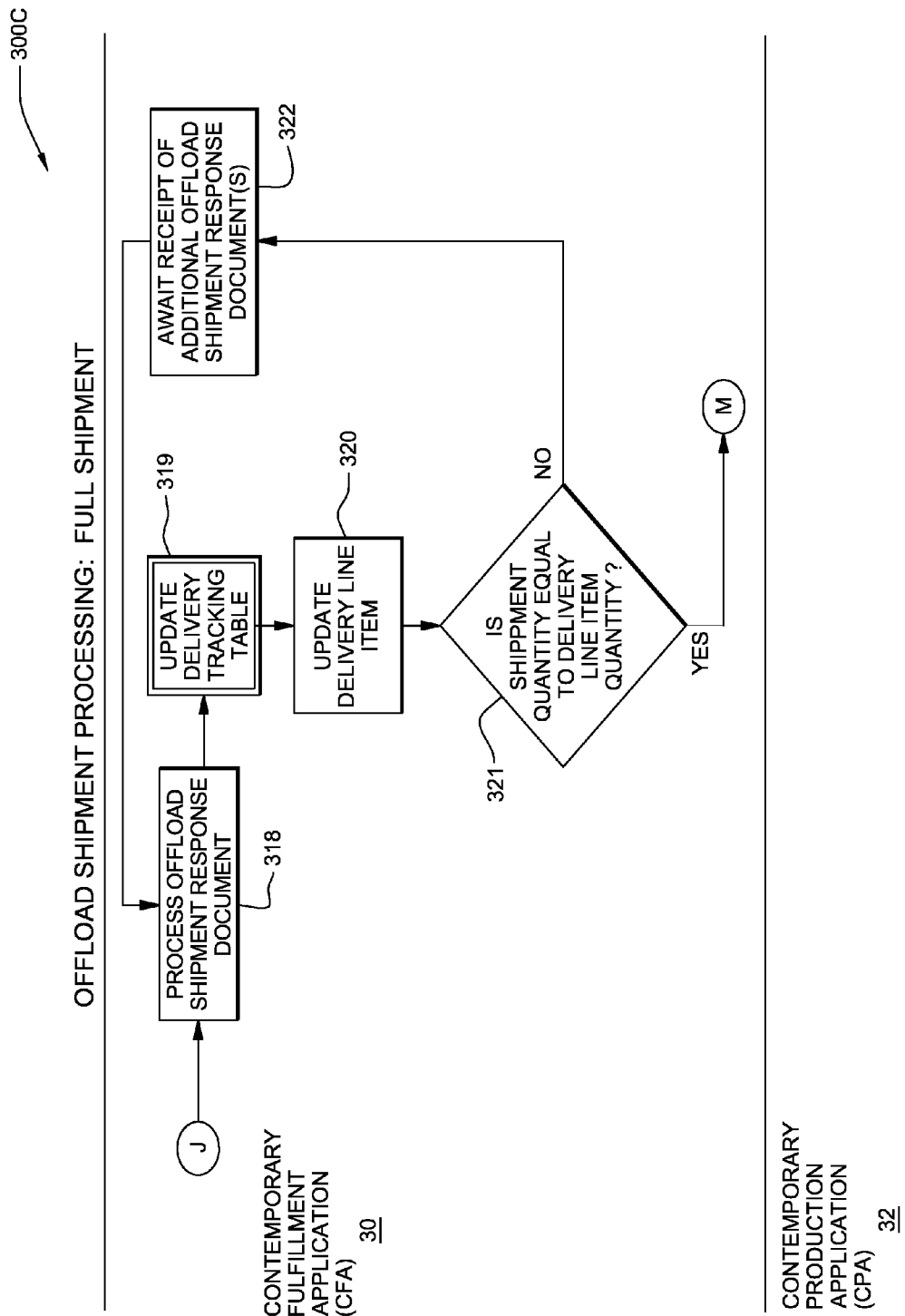

Referring to FIG. 3C, 300C outlines the offload process carried out by the contemporary fulfillment application (CFA) 30 upon receiving a shipment response document (in an embodiment, an IDoc) from the contemporary production application (CPA) 32 reflecting that the total quantity of the order requested is scheduled to be shipped or delivered. In step 318, the CFA 30 processes the offload shipment response document and updates, in step 319, a delivery tracking table.

Further, the offload processing tool in the CFA updates the quantity in the delivery line item in step 320 by selecting or picking or entering the total quantity set forth in the shipment response document. In step 321, a determination is made by the offload processing tool as to whether the shipment quantity is equal to the delivery line item quantity. If the shipment quantity is not equal to the delivery line item quantity, then the contemporary fulfillment application 30 awaits in step 322 receipt of additional offload shipment response documents and the process returns to step 318. However, if the shipment quantity is equal to the delivery line item quantity, then the process continues (referenced by the arrow having a "M" in a circle) in FIG. 3F with step 338.

Referring back to FIG. 3B, if in steps 315 and 316, the CFA 30 receives an offload shipment response setting forth only a partial quantity of cut-back quantity of the initial quantity requested, then the CFA 30 processes in step 323 (as shown in 300D of FIG. 3D) the partial or cut-back offload shipment response received from the CPA 32. The CFA 30 updates in step 324 a delivery tracking table and further updates the delivery line item in step 325 by picking or selecting a quantity reflecting the partial quantity scheduled for shipment. In step 326, a determination is made by the offload processing tool as to whether the shipment quantity is equal to the delivery line item quantity. If the shipment quantity is not equal to the delivery line item quantity, then the contemporary fulfillment application 30 awaits in step 327 receipt of additional offload shipment response documents. Further, the CFA 30 processes in step 328 the partial or cut-back offload shipment response document received from the CPA (contemporary production application) 32. In particular, the CFA 30 reduces in step 329 the delivery line item order quantity by the cut-back amount and the process continues (referenced by the arrow having a "M" in a circle) in FIG. 3F with step 338. In addition, the CFA 30 applies a delivery block in step 330 to the associated offload order line item in order to prevent additional delivery requests from being sent to the CPA before customer service has had an opportunity to initiate the actual cancellation of the customer order, ending the process at step 331. Referring back to step 326, if the shipment quantity is equal to the delivery line item quantity, then the process continues (referenced by the arrow having a "M" in a circle) in FIG. 3F with step 338.

Further, referring back to FIG. 3B, if in step 317, the CFA 30 receives a cancellation offload shipment response setting forth no quantity amount of the initial quantity requested, then the CFA 30 processes in step 332 (as shown in 300E of FIG. 3E) the cancellation offload shipment response received from the CPA 32. The offload processing tool in the CFA 30 updates in step 333 a delivery tracking table and further, in step 334, determines whether a delivery line item quantity exists. If no delivery line item quantity exists, then the delivery is deleted in step 335 and a delivery block is applied to the associated offload order line item in step 336, ending the process at step 337. However, referring back to step 334, if a delivery line item quantity exists, then the process goes back and continues (referenced by the arrow having a "K" in a circle) with step 323 of FIG. 3D.

Figure 3D:
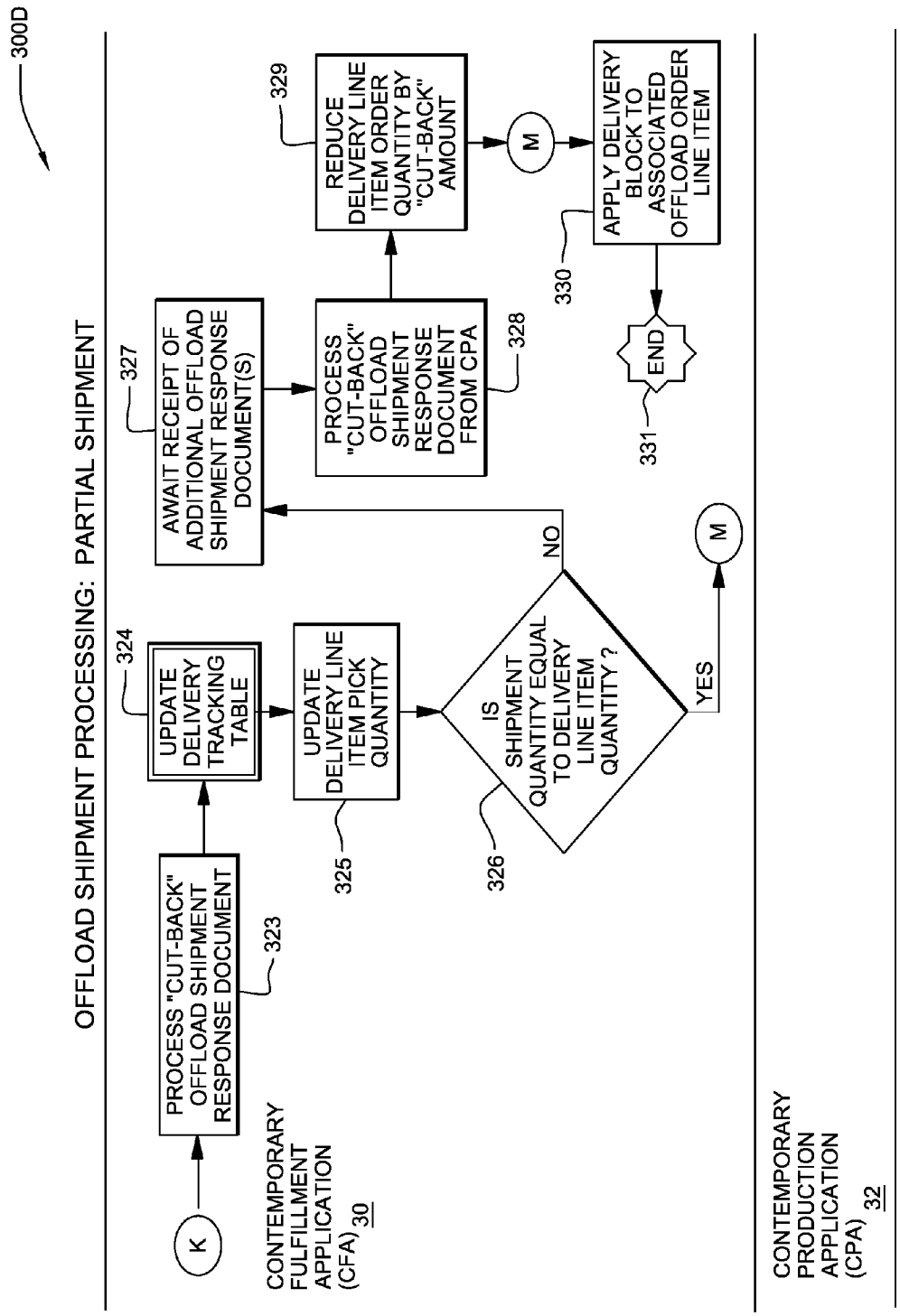
Figure 3E:
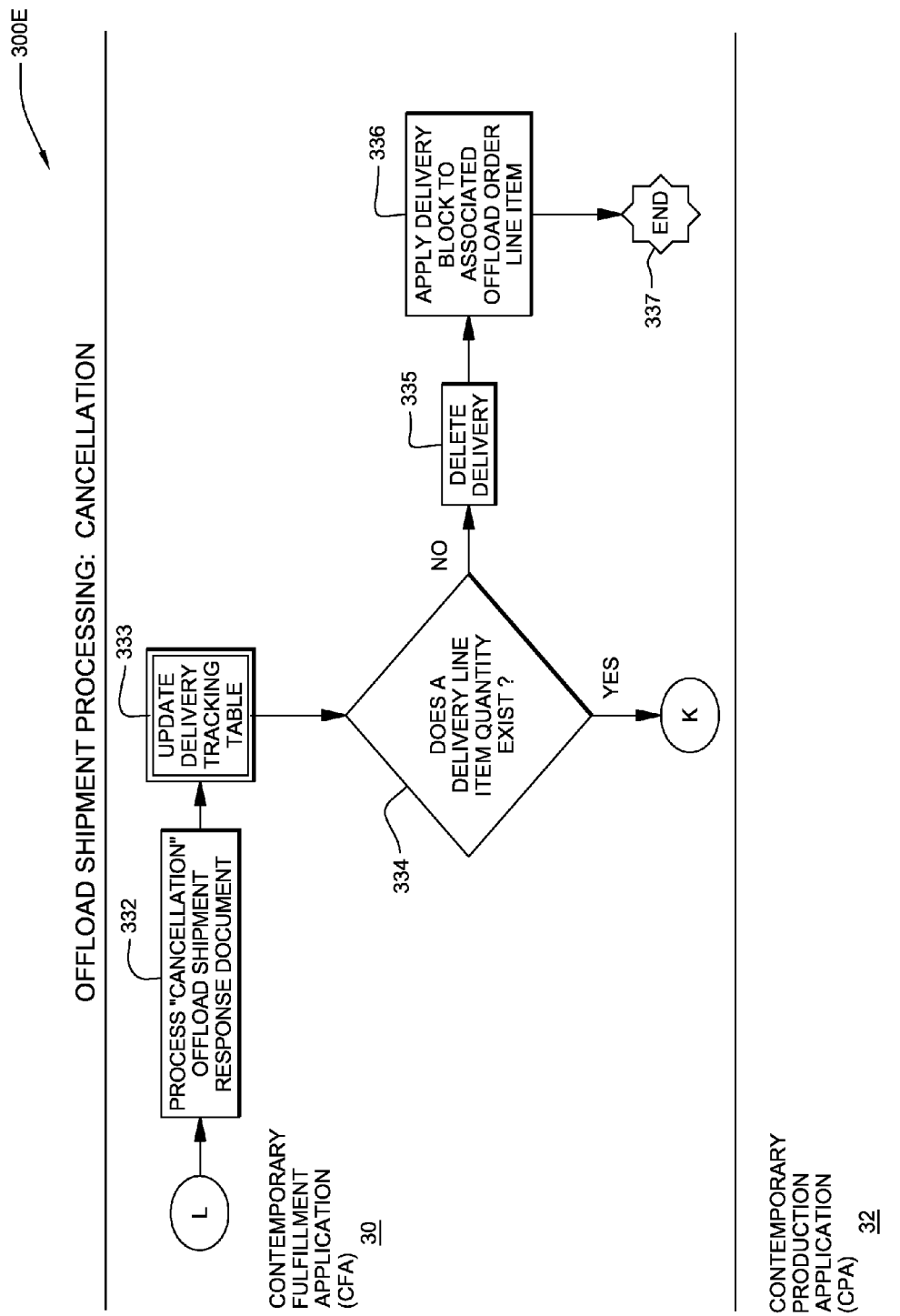
Figure 3F:
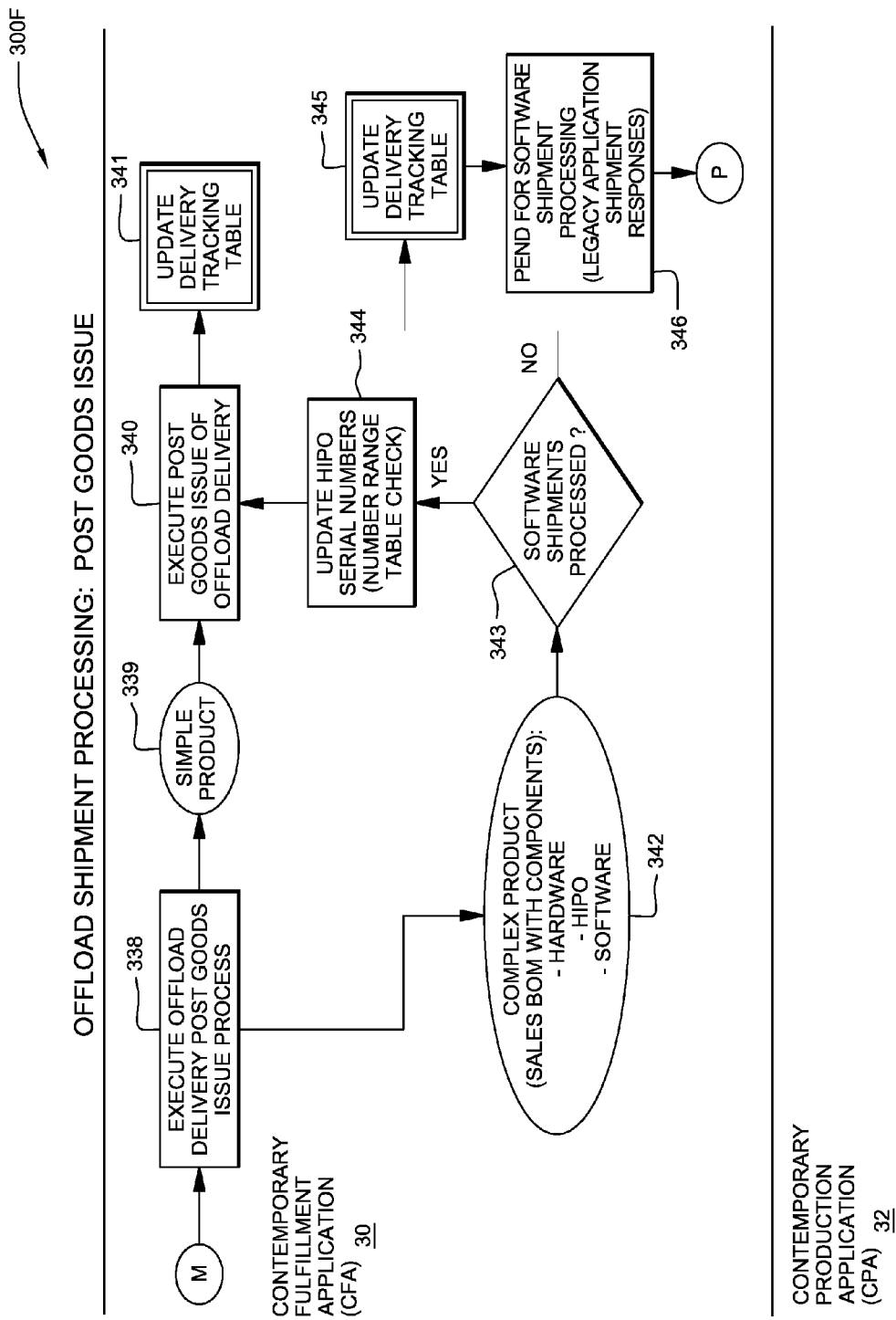

Referring to FIG. 3F, 300F outlines the post goods issue process after the offload processing tool has processed either a total or full offload shipment or a partial or cut-back offload shipment, as discussed herein above with respect to FIGS. 3C and 3D. In step 338, the contemporary fulfillment application (CFA) 30 begins execution of the offload delivery post goods issue process for closing out the delivery document. In particular, the offload processing tool of the CFA 30 determines in step 339 if the order pertains to a simple product and, if so, the CFA 30 executes in step 340 a post goods issue of the offload delivery and further updates a delivery tracking table in step 341. However, if the CFA 30 determines in step 342 that the order pertains to a complex product, that is, any sales BOM (Bill of Material) with components, such as, hardware, software and/or Hardware Integrated Program Offering (HIPO), then in step 343 a determination is made by the contemporary fulfillment application 30 as to whether or not software shipments have been processed. If the software shipments have been processed, the CFA 30 updates the HIPO serial numbers in an appropriate table in step 344 and executes in step 340 a post goods issue of the offload delivery and further updates a delivery tracking table in step 341. On the other hand, if software shipments have not been processed in step 343, then the CFA 30 updates a delivery tracking table in step 345 and awaits (pend for) in step 346 the software shipment processing carried out by the legacy application, which processes shipment of software orders. The process then continues (referenced by the arrow having a "P" in a circle) in FIG. 3G with step 347.

Figure 3G:
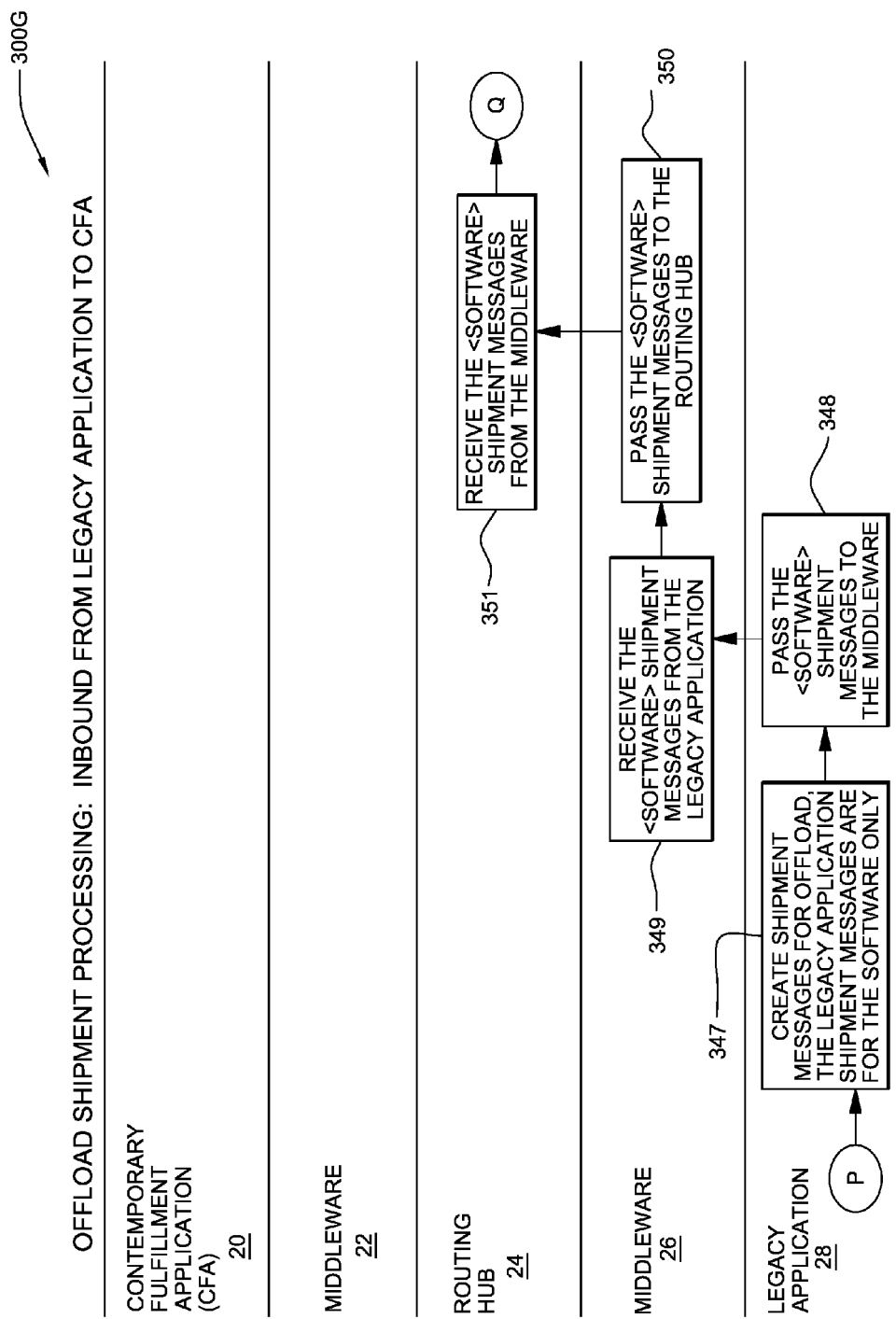

Turning to FIG. 3G, 300G outlines the inbound process from the legacy application 28 to the contemporary fulfillment application 20, when software is involved. In particular, when a sales BOM (Bill of Material) having components, such as, hardware, HIPO (Hardware Integrated Program Offering) and software is processed, only the hardware and HIPO components are deemed offloaded to an offload site recommended by the contemporary fulfillment application, whereas, the software is routed to a legacy manufacturing site by the legacy application. As such, the contemporary fulfillment application (CFA) has to not only coordinate the shipment responses received from the contemporary production application (CPA) for the hardware and HIPO components, but also and has to coordinate shipment responses received from the legacy application for the software components of a sales BOM, as described in the inbound flow of the shipment data received from the legacy application shown in FIGS. 3G through 3L. The outbound request message is communicated to the legacy application via the middleware 22, the routing hub 24 and the middleware 26, as described herein above with respect to FIGS. 2A and 2B. Accordingly, when the legacy application receives the outbound request message, the legacy application 28, creates a shipment response message in step 347 of FIG. 3G pertaining only to the software portion of the order for sending to the offload processing tool in the contemporary fulfillment application 20. In an embodiment, the shipment response message is created in a second format or a legacy format native to the legacy application 28. The legacy application 28 passes or forwards or sends in step 348 the shipment response message created to the middleware 26. The middleware 26 receives from the legacy application 28 in step 349 the shipment response message for the software and passes in step 350 the shipment response message received to the routing hub application 24. The routing hub application 24 receives in step 351 from the middleware 26 the shipment response message pertaining to the scheduled shipment date for the software. The method or process then continues (referenced by the arrow having a "Q" in a circle) in FIG. 3H with step 352.

Figure 3H:
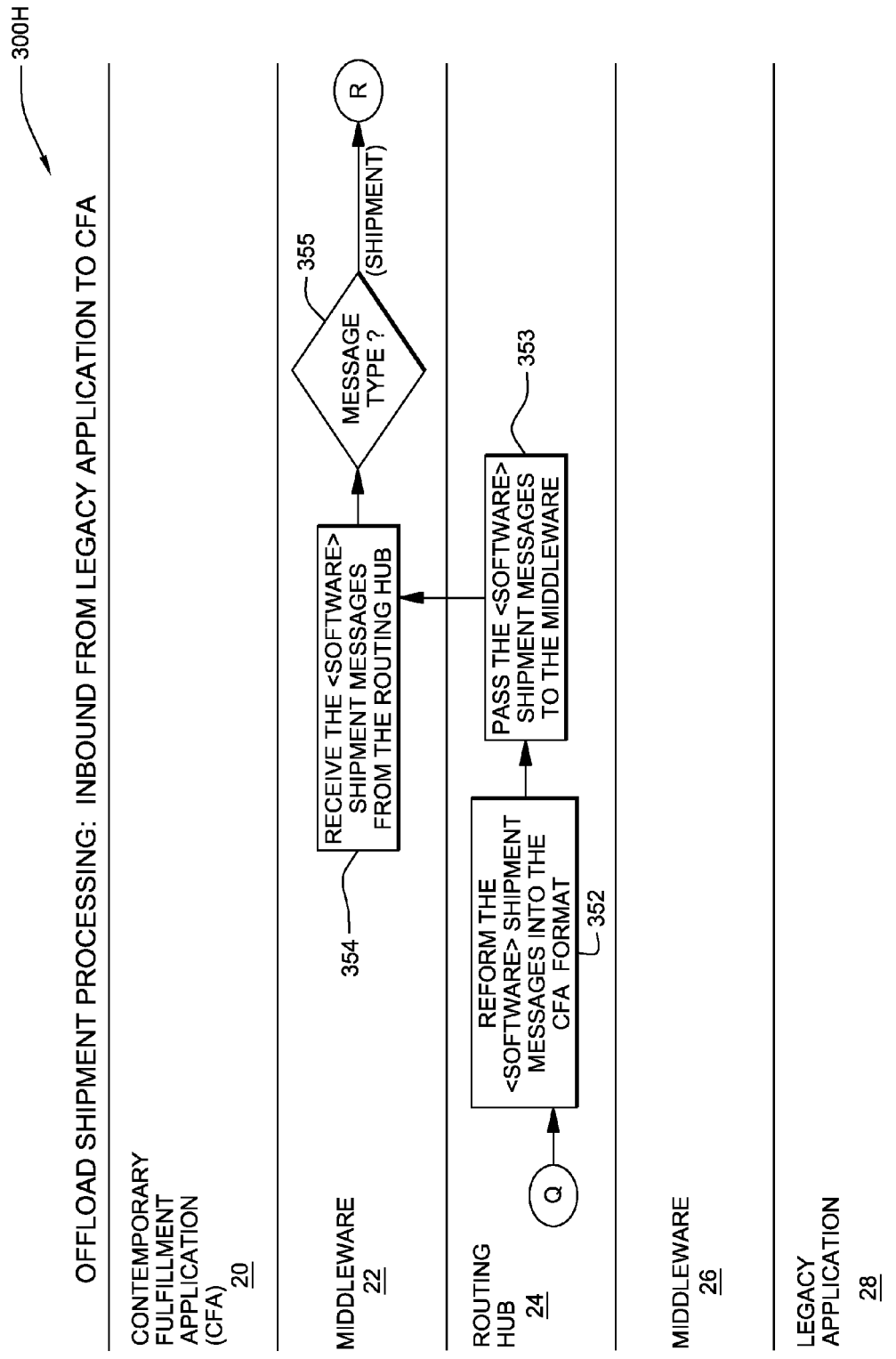

Turning to FIG. 3H, reference numeral 300H outlines the inbound communication process between the routing hub application 24 and the middleware 22. As shown in FIG. 3H, the routing hub application 24 reformats in step 352 the shipment response message received from the legacy application 28 via the middleware 26. In particular, the routing hub application 24 reformats the shipment response message received in the legacy format into a first format, namely, a contemporary format that is native to or understood by the contemporary fulfillment application, such as, a format understood by the SAP® R/3 software application 20. Further, the routing hub application 24 passes or routes in step 353 the reformatted shipment response message to the middleware 22. The middleware 22 receives in step 354 the reformatted shipment response message in the first format or contemporary format and determines in step 355 the message type, namely, whether the shipment response message is a new shipment response message or a reshipment response message. The method or process then continues (referenced by the arrow having a "R" in a circle) in FIG. 3I with step 356.

Figure 3I:
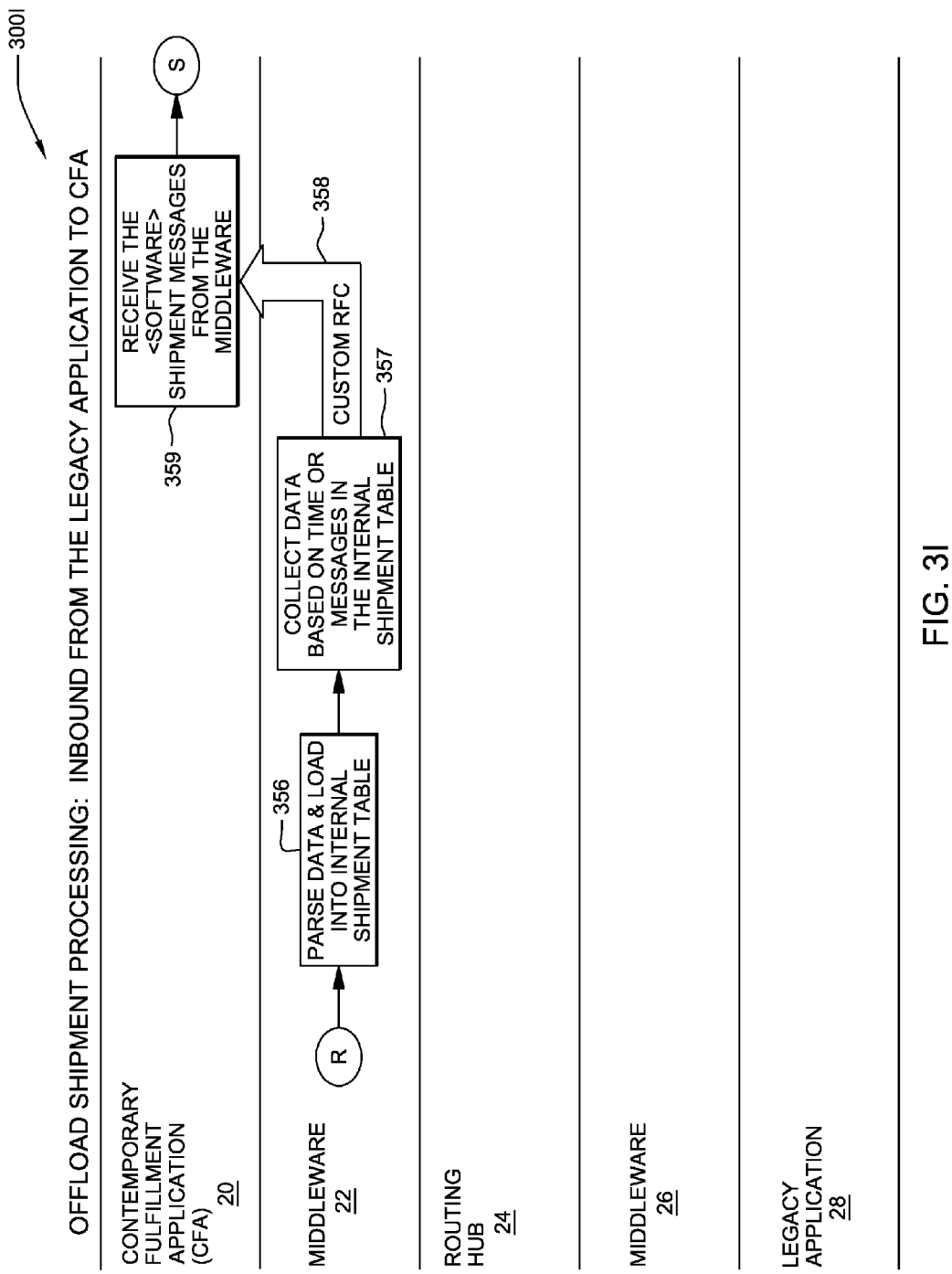

Turning to FIG. 3I, reference numeral 300I outlines the inbound communication process between the middleware 22 and the contemporary fulfillment application 20, in an embodiment, the SAP® R/3 software application. As shown in step 356 of FIG. 2E, the middleware 22, which in an embodiment is Websphere MQ, parses the data contained in the shipment response message and loads or stores the parsed data temporarily into one or more internal shipment tables in the middleware 22. Further, in an embodiment, the middleware 22 continues to collect and group in step 357 data contained in the shipment response messages received from the routing hub application 24 either based on a pre-determined collection criterion, such as, a pre-determined/preset time interval, for instance, every minute or every 2 minutes, etc. or based on a pre-determined/preset number or threshold of shipment response messages received and collected, for instance, collecting data until 100 shipment response messages have been collected or 1000 shipment response messages have been collected within the one or more internal shipment tables. As such, the middleware 22 collects data contained in each shipment response message received either until the pre-determined time interval has elapsed or until the middleware 22 has reached the preset or pre-determined number of shipment response messages. The data collected in step 357 is stored or loaded as a collection or group in the internal shipment table(s) within the middleware 22 on a temporary basis until the pre-determined time interval or the pre-set number of shipment messages has been reached, which then triggers in step 358 the invoking of a RFC (Remote Function Call) for sending the shipment data to the contemporary fulfillment application 20, for instance, the SAP® R/3 software application. In an embodiment, the middleware 22 stores or loads the data collected for the collection or group of shipment messages in a flat file format within the shipment table within the middleware 22. Thus, upon reaching either the pre-determined time interval or the pre-determined number of shipment response messages in step 230, the middleware 22 invokes a custom remote function call (RFC) in step 358 for calling or invoking an appropriate function module within the contemporary fulfillment application or SAP® R/3 software application 20 for processing the collection or group of shipment response messages. The contemporary or SAP® R/3 software application 20 receives in step 359 the shipment response messages as a collection or group from the middleware 22 and the method or process continues (referenced by the arrow having a "S" in a circle) in FIG. 3J with step 360.

Figure 3J:
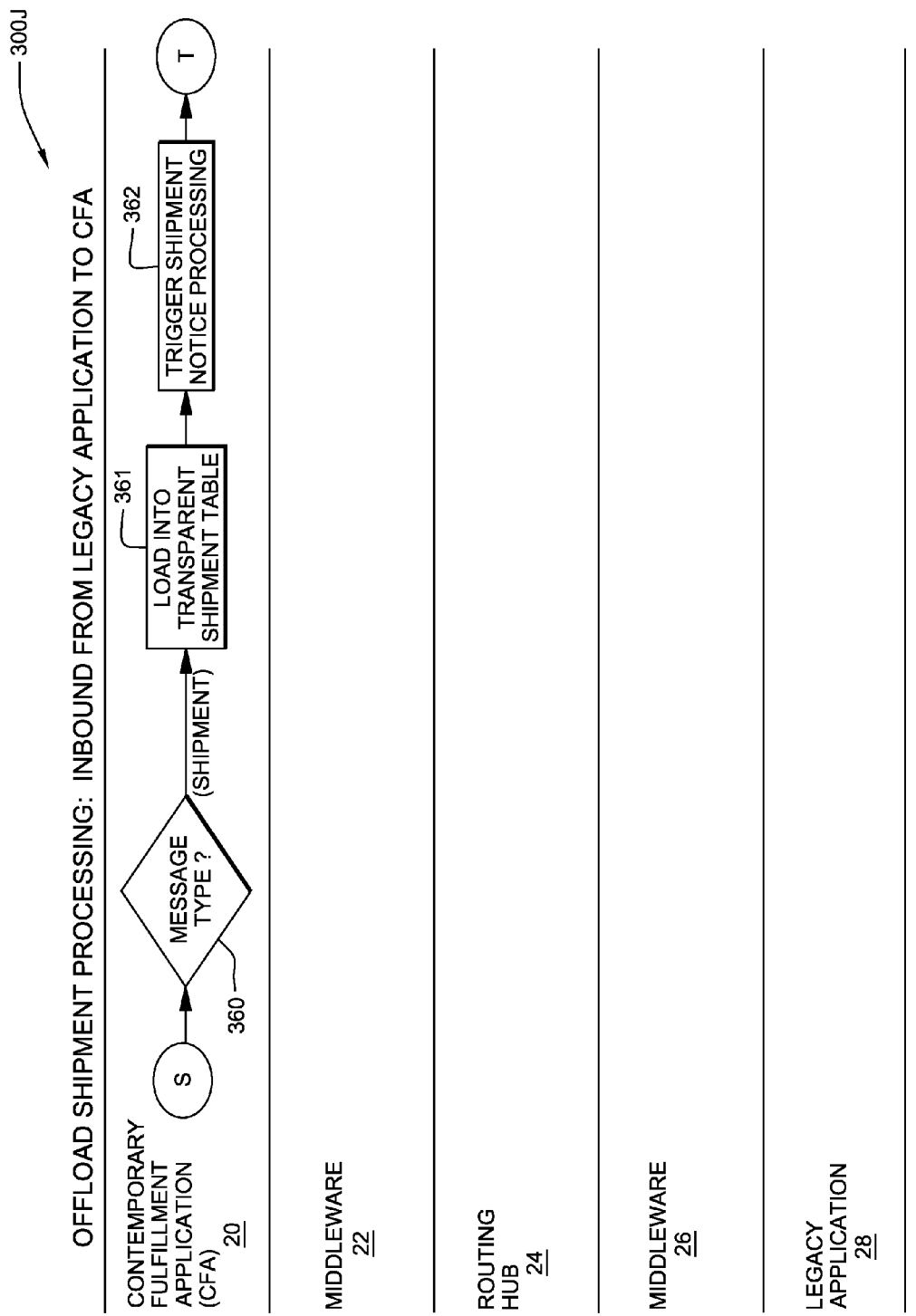
Figure 3K:
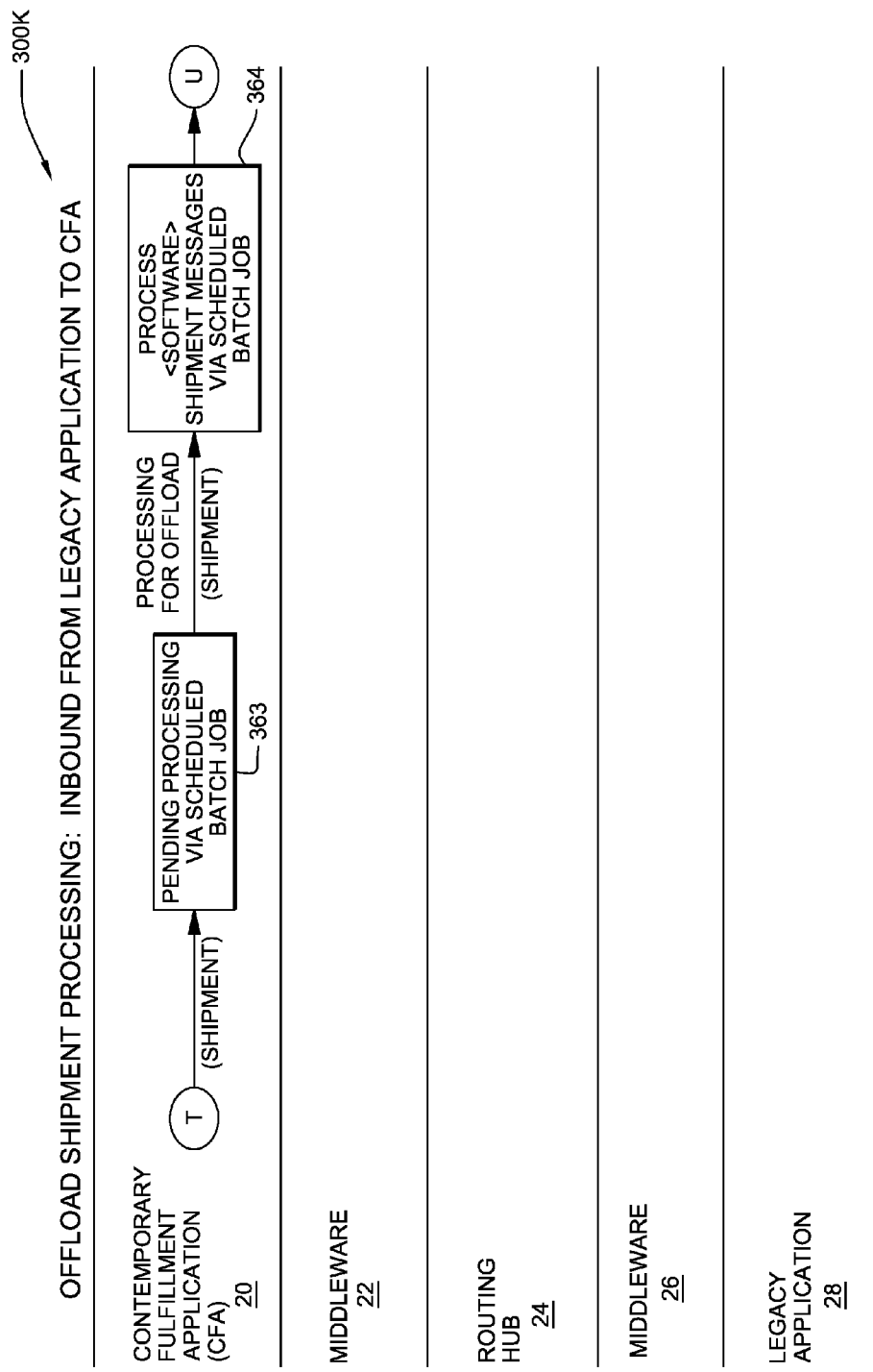

Turning to FIG. 3J, reference numeral 300J outlines the inbound processing function carried out by the contemporary fulfillment application 20, for instance, the SAP® R/3 software application, for processing the shipment data or information pertaining to software orders contained in the shipment response message received in step 359 (of FIG. 3I). As shown in FIG. 3J, in step 360, the contemporary fulfillment application 20 (in an embodiment, the SAP® R/3 software application) confirms the message type of the collection of shipment response messages received in step 359 (shown in FIG. 3I) from the middleware 22. In an embodiment, the contemporary fulfillment application determines the message type in step 360 based upon the message type value contained within a file that is received. If the collection of response messages received by the contemporary fulfillment application 20 is confirmed to be a shipment response message collection, the contemporary fulfillment application 20 loads in step 361 the data contained in the collection of shipment response messages into an internal shipment table or a transparent shipment table within the contemporary fulfillment application 20 or SAP® R/3 software application. Further, the loading of the data into the scheduling table triggers in step 362 the shipment notice processing of the shipment messages within the contemporary fulfillment application 20. In particular, the contemporary fulfillment application 20 further groups all the shipment response messages according to pre-determined processing criteria, such as, date, time, order number, etc. Furthermore, the contemporary fulfillment application 20 uses the processing criteria (date, time, order number, etc.) contained in the shipment response message group to discard any duplicate shipment response messages, thus, maximizing efficiency by reducing the amount of data that is processed, as well as reducing the amount of time spent in processing any duplicate shipment response messages. After the contemporary fulfillment application 20 has processed the shipment response messages, the method or process continues (referenced by the arrow having a "T" in a circle) in FIG. 3K with step 363.

Figure 3L:
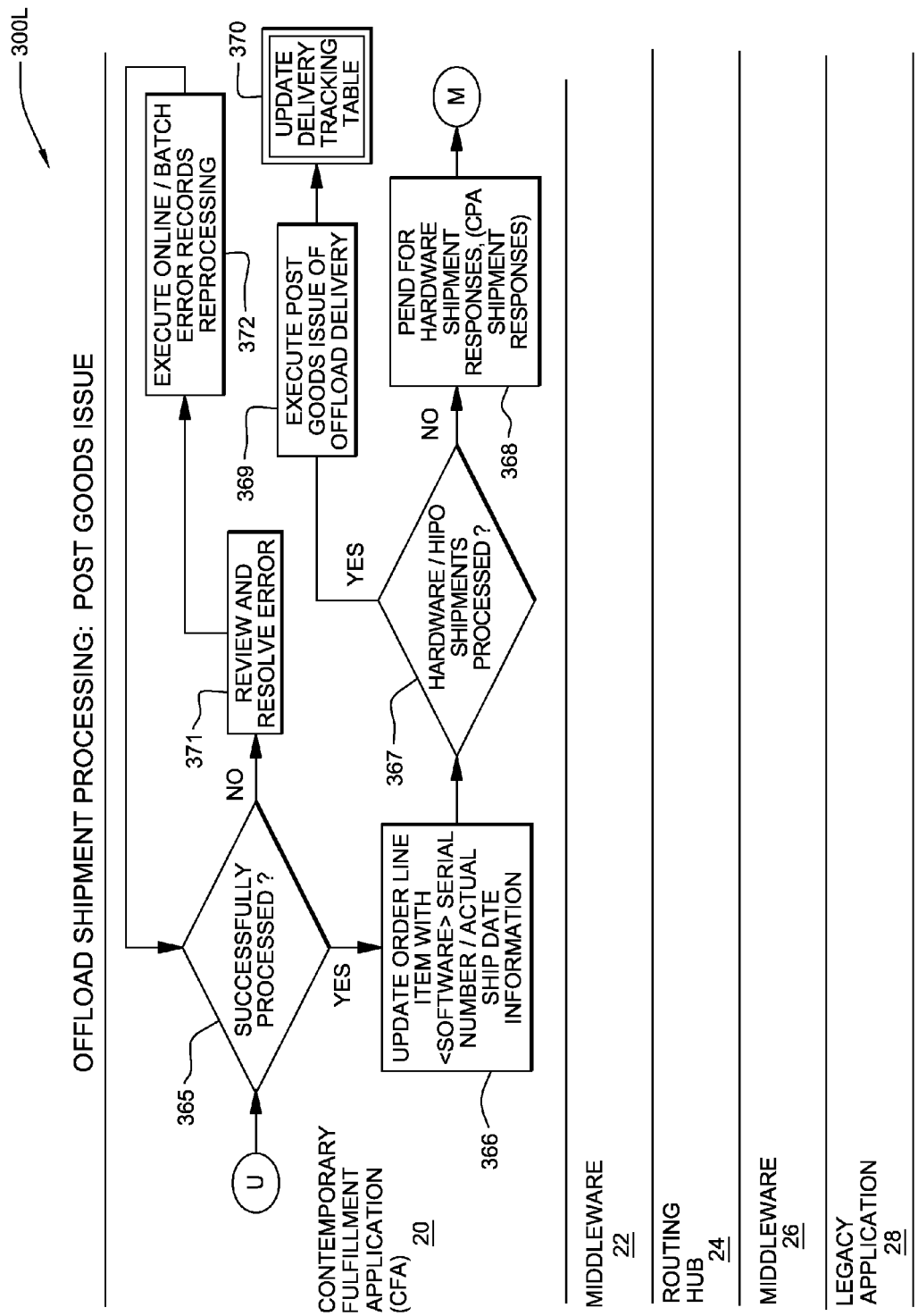

Turning to FIGS. 3K and 3L, 300K and 300L outline the steps carried out by the contemporary fulfillment application with respect to processing of the shipment response messages received for software orders. In step 363, the CFA 20 awaits or prepares processing of the shipment messages via a scheduled batch job and in step 364, the contemporary fulfillment application processes the software shipment messages by running the scheduled batch job. The method or process continues (referenced by the arrow having a "U" in a circle) in FIG. 3L with step 365. As shown in FIG. 3L, the CFA 20 determines in step 365 if the shipment messages have been successfully processed. In particular, if a record (corresponding to a shipment response message) in a table fails during processing, certain fields are updated in the contemporary fulfillment application to indicate the specific error and the status of the error. If the contemporary fulfillment application 20 determines in step 365 that the messages were not successfully processed, then the contemporary fulfillment application 20 (or SAP® R/3 software application) reviews in step 371 the error(s) found and resolves any error(s) found. Furthermore, the contemporary fulfillment application 20 (SAP® R/3 software application) executes in step 372 either an online re-processing of the shipment data records or messages shown to have processing error(s) in step 371, that is, the contemporary fulfillment application 20 executes re-processing of the shipment messages that were not processed successfully the first time around) or executes a batch error records reprocessing of the shipment records or messages at a scheduled time. Additionally, the contemporary fulfillment application 20 repeats steps 365 through 372, until all shipment messages with error(s) have been successfully processed. However, if it is determined in step 365 that the shipment messages were processed successfully and/or after reviewing and resolving any errors, then the CFA 20 updates in step 366 the order line item with the serial number and/or actual ship date information. Further, the CFA 20 determines in step 367 if the hardware and/or HIPO (Hardware Integrated Program Offering) orders have been processed. If the hardware and HIPO orders have been processed, then in step 369, the CFA 20 executes in step 369 a post goods issue of the offload delivery and further updates a delivery tracking table in step 370. On the other hand, if the hardware and/or HIPO (Hardware Integrated Program Offering) orders have not been processed, then the CFA awaits (Pend for) in step 368 the hardware shipment processing carried out by the contemporary production application, which processes shipment of all the other offload orders, except for the software orders, thus, continuing the process (referenced by the arrow having a "M" in a circle) in FIG. 3F with step 338, as discussed herein above.

In another aspect of the invention, there is provided a system for routing a customer order to a preferred manufacturing site. The system comprises a first application configured to send a scheduling request corresponding to a customer order received, the scheduling request including an administrative feature code designating that the customer order be fulfilled by a preferred manufacturing site, wherein the first application is further configured to manage routing of the customer order directly, a second application configured to receive the scheduling request sent by the first application, the second application being configured to send to the first application a scheduling response including a manufacturing plant identification code set to correspond to the preferred manufacturing site designated for fulfilling the customer order, the second application being unable to directly route the customer order to the preferred manufacturing site and a third application configured to receive from the first application a shipment request for the customer order to be fulfilled by the preferred manufacturing site designated, the third application being configured to route the customer order to the preferred manufacturing site and to send back to the first application a shipment response notifying the first application of a delivery status for the customer order routed to the preferred manufacturing site. In an embodiment, the first application is further configured to determine if the customer order is to be fulfilled by the preferred manufacturing site and, if so, to include the administrative feature code in the scheduling request sent to the second application requesting that the customer order be fulfilled by the preferred manufacturing site. In an embodiment, the first application is further configured to ascertain a date when materials are available at the preferred manufacturing site for shipping the customer order and to generate, upon reaching the date ascertained, the shipment request for sending to the third application for routing the customer order to the preferred manufacturing site for shipment. In an embodiment, the first application is further configured to update a table for tracking a delivery status for the customer order shipped from the preferred manufacturing site. In an embodiment, the third application is further configured to provide to the first application a delivery status for the customer order routed to the preferred manufacturing site and wherein the second application is further configured to provide to the first application a shipping status for any portion of the customer order routed to a legacy manufacturing site. In an embodiment, the first application is a fulfillment application, the second application is a scheduling and sourcing application and the third application is a production application.

Figure 4:
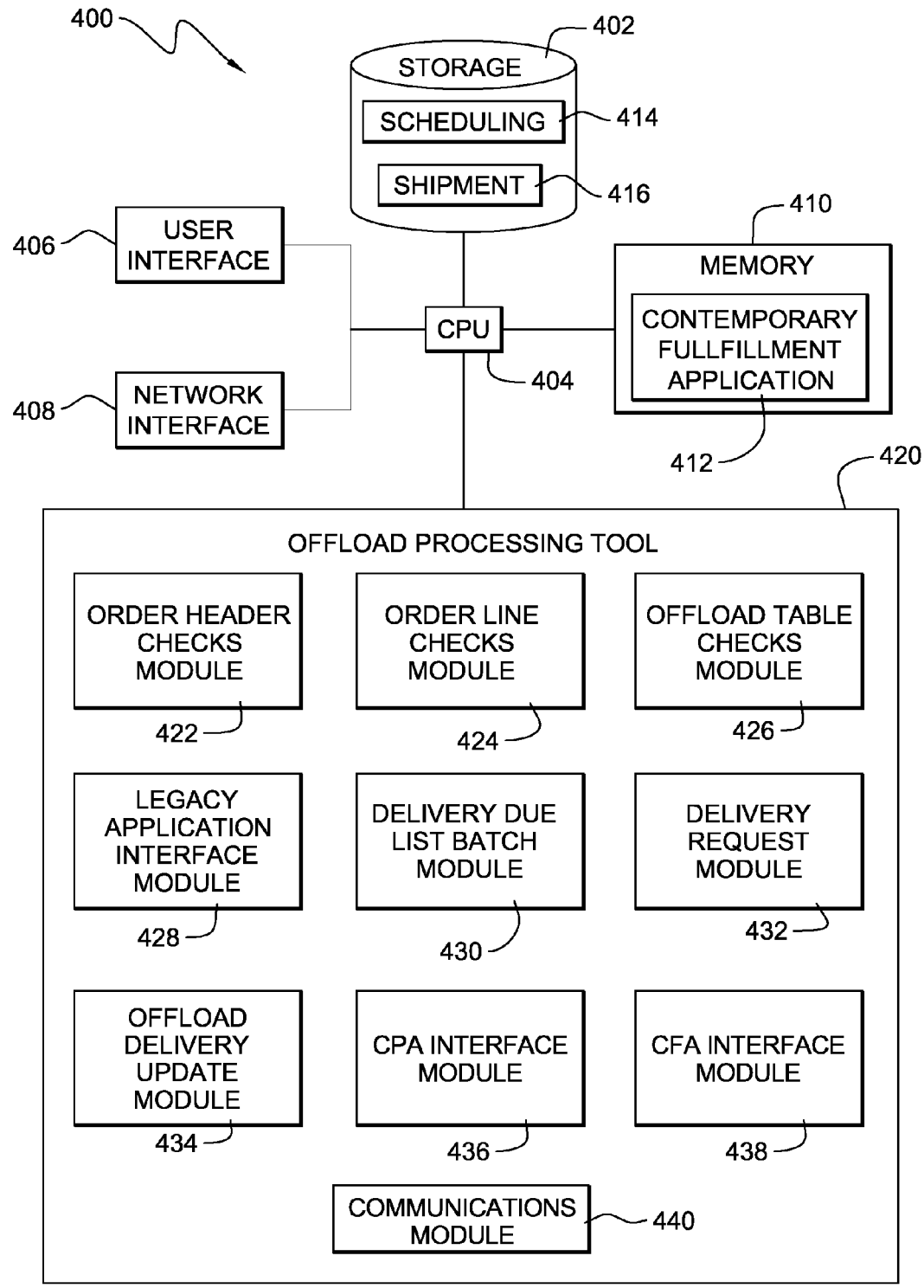
FIG. 4 is a schematic block system diagram illustrating an embodiment of an order fulfillment system having an order processing tool for determining eligibility of an order for offloading to a specific or offload manufacturing site in order to optimize management of the order, in accordance with an embodiment of the invention.
Figure 5:
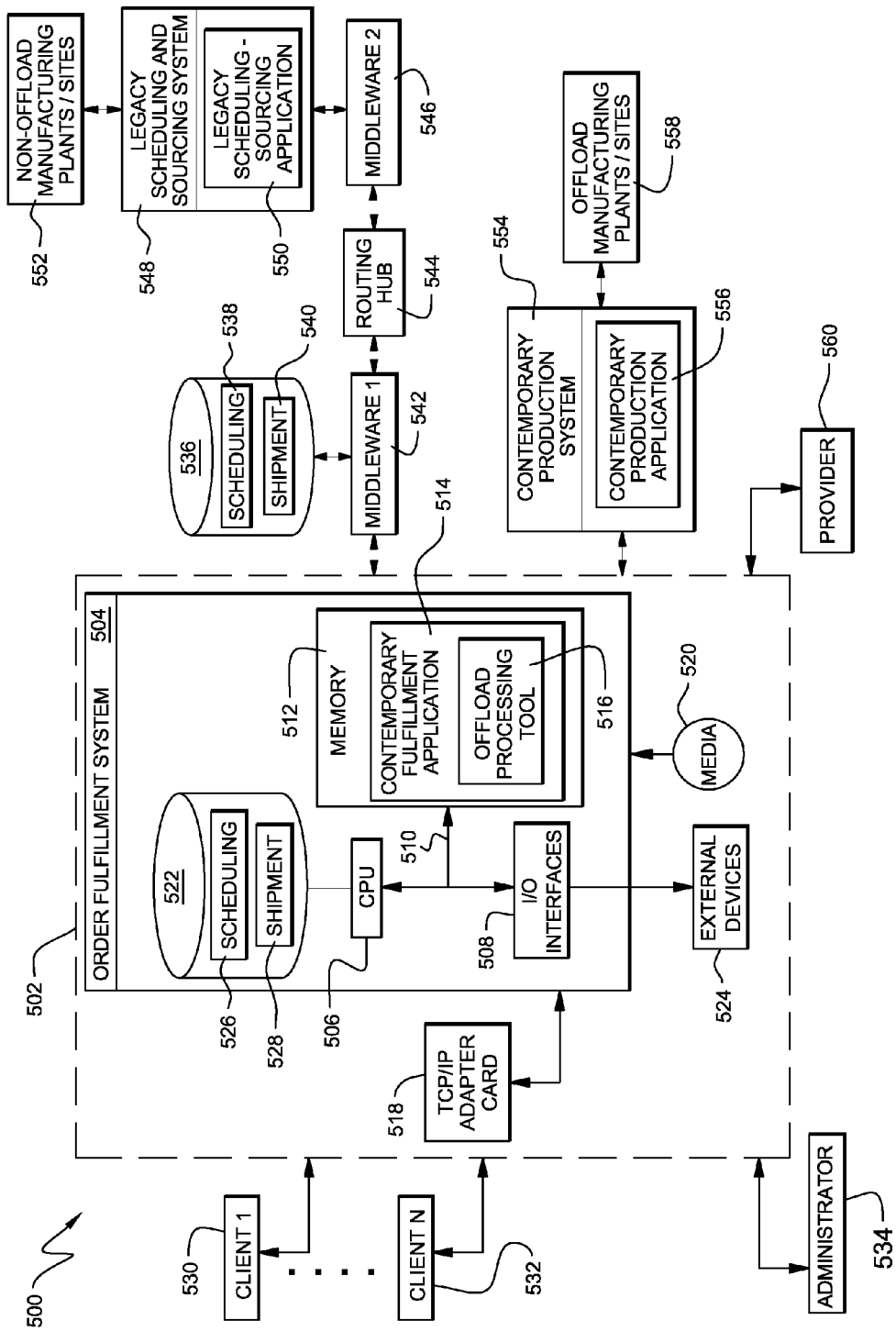
FIG. 5 is a schematic block system diagram illustrating an embodiment of an order fulfillment system having a computer program product for optimizing management of the order, in accordance with an embodiment of the invention.

Reference is now made to FIGS. 4 and 5, which illustrate various aspects of a system for routing or offloading a customer order to a preferred or specific manufacturing site or plant, in accordance with an embodiment of the invention. Turning to FIG. 4, reference numeral 400 is a schematic block system diagram illustrating one embodiment of an order fulfillment or order processing system or server 400 having an offload processing tool or code 420 deployed thereon, the offload processing tool or code 420 being configured to offload fulfillment of an order to a specific manufacturing site or plant, in accordance with an embodiment of the invention. Preferably, the order fulfillment or processing server 400 has installed and running thereon (shown in local memory 410) a contemporary order processing application or a contemporary fulfillment application (CFA) 412, for instance, the SAP R/3 software application mentioned herein above. It is understood that any other commercially available order processing or fulfillment application may be used to practice this invention. The order processing server or system 400 comprises a central processing unit (CPU) 404, a local storage device 402, a user interface 406, a network interface 408, and a memory 410. The CPU 404 is configured generally to execute operations within the system/server 400, such as, the offload processing code or tool 420 and the order fulfillment or contemporary fulfillment application or program 412. The user interface 406, in one embodiment, is configured to allow a user or programmer to interact with the system 400, including allowing input of data and commands from a user and communicating output data to the user. The network interface 408 is configured, in one embodiment, to facilitate network communications of the system 400 over a communications channel of a network.

In one embodiment, as shown in FIG. 4, the offload processing tool or code 420 which, in an embodiment, runs on the order processing server or system 400, comprises a logic unit that contains a plurality of modules configured to functionally execute the necessary steps of managing the routing or offloading of a customer order to a preferred or specific manufacturing site or plant. In particular, the offload processing tool or code 420 comprises an order header checks module 422, an order line checks module 424, an offload table checks module 426, a legacy application interface module 428, a delivery due list (DDL) batch module 430, a delivery request module 432, an offload update module 434, a CPA (contemporary production application) interface module 436, a CFA (contemporary fulfillment application) interface module 438 and a communications module 440. The order header checks module 422 is configured to run header checks for determining orders to be offloaded as discussed herein above with respect to FIG. 1A, whereas, the order line checks module. 424 is configured to run order line checks for determining orders to be offloaded as discussed herein above with respect to FIGS. 1B through 1D. Further, the offload table checks module 426 is configured to run table checks for determining orders to be offloaded as discussed herein above with respect to FIG. 1E. The legacy application interface module 428 is configured to interface with the legacy application for carrying out the process described in FIGS. 2A through 2I. The delivery due list (DDL) batch module 430 is configured to run or execute the delivery due list corresponding to specific offload shipping points for initiating offload processing, as discussed herein above with respect to FIG. 3A. Further, the delivery request module 432 is configured to check the material availability date and to create a delivery request document using the contemporary fulfillment application, the delivery request document being transmitted to the contemporary production application. The offload delivery update module 434 is configured to update delivery tracking tables for orders that are offloaded to the contemporary production application for fulfillment. The CPA (contemporary production application) interface module 436 is configured to interface with the CPA for transmitting delivery requests from the CFA and for receiving shipment responses from the CPA, as described herein above with respect to FIGS. 3A and 3B. Further, the CFA (contemporary fulfillment application) interface module 438 is configured to interface with the CFA for processing shipment responses received from the CPA, as described herein above with respect to FIGS. 3C through 3L. In addition, the communications module 440 is configured to permit communication between the various modules of the offload processing tool or code 420, contemporary fulfillment application 412 and other systems, such as, the contemporary production application (556, shown in FIG. 5).

Referring now to FIG. 5, there is illustrated a system 500 that provides a computer program product for managing a customer order, in accordance with an embodiment of the present invention. The computer program product comprises a computer readable or computer-usable medium, which provides program code, namely, the offload processing tool 516, for use by or in connection with a computer or any instruction execution system. The offload processing tool or program 516 can be loaded into the order fulfillment system 504 from a computer readable media 520, such as, a magnetic tape or disk, optical media, DVD, memory stick, semiconductor memory, etc. or downloaded from the Internet via a TCP/IP adapter card 518 or a network card. As depicted in FIG. 5, system 500 includes a computer infrastructure 502, namely, an order fulfillment infrastructure 502, which is intended to represent any type of computer architecture that is maintained in a secure environment (i.e., for which access control is enforced). As shown, infrastructure 502 includes a computer system 504 that typically represents an application server or system 504, in particular, an order fulfillment server or the like that includes an order fulfillment application (contemporary fulfillment application) 514 configured to process or manage an order using the offload processing tool 516 and to communicate the order to different external systems, such as, the scheduling-sourcing application 550 (or legacy application), deployed on a legacy scheduling and sourcing server 548, where messages are communicated using middleware 1 (reference numeral 542), routing hub 544 and middleware 2 (reference numeral 546). It should be understood, however, that although not shown, other hardware and software components (e.g., additional computer systems, routers, firewalls, etc.) could be included in infrastructure 502.

In general, users at client 1 (reference numeral 530) through client N (reference numeral 532) input orders into the order processing system 504, which has deployed thereon the order processing application 514 that includes the offload processing tool 516. The order processing application (or contemporary fulfillment application) 514 creates, using the offload processing tool 516, one or more scheduling request messages containing an offload feature code and routes (to the legacy application 550 deployed on the scheduling and sourcing system 548 via middleware 1 (reference numeral 542), routing hub (reference numeral 544) and middleware 2 (reference numeral 546)) the scheduling request messages requesting that orders be sourced or offloaded to different or offload manufacturing sites or plants (reference numeral 558), which are routed to the contemporary production application 556 deployed on the contemporary production system (reference numeral 554) by the contemporary fulfillment application 514. Further, contemporary fulfillment application 514 is configured to send to the legacy application 550 scheduling request messages for orders, such as, software orders that are to be sourced by standard or non-offloaded manufacturing sites or plants (reference numeral 552), which are routed by the legacy application 550 to the non-offload manufacturing plants/sites 552 directly.

As shown in FIG. 5, the order fulfillment system 504 (which includes the order processing application 514 and the offload processing tool 516) within infrastructure 502 communicates with the various other systems and/or servers, such as, the middleware 1 (reference numeral 542), the routing hub 544 and the scheduling and sourcing system 548 (which includes the scheduling-sourcing application 550). To this extent, infrastructure 502 provides a secure environment. In particular, a user (at client A, reference numeral 530 through client N, reference numeral 532) accesses the order processing server or system 504 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 502. It should be understood that under the present invention, infrastructure 502 could be owned and/or operated by a party such as provider 560, or by an independent entity. Regardless, use of infrastructure 502 and the teachings described herein could be offered to the parties on a subscription or fee-basis. In either scenario, an administrator 534 could support and configure infrastructure 502, for supporting and/or configuring the infrastructure 502, such as, upgrading the offload processing tool 516 in the order fulfillment system 504.

The order processing system or server 504 is shown to comprise a CPU (hereinafter "processing unit 506"), a memory 512, a bus 510, and input/output (I/O) interfaces 508. Further, the server 504 is shown in communication with external I/O devices/resources 524. In general, processing unit 506 executes computer program code, such as the contemporary fulfillment application (or order processing application) 514, which comprises the offload processing tool or code 516. While executing computer program code, the processing unit 506 can read and/or write data, to/from memory 512, storage system 522, and/or I/O interfaces 508. For instance, in one embodiment, the offload processing tool 516 stores the scheduling data received from middleware 1 (reference numeral 542) for the orders to be offloaded to the contemporary production application 556 in the scheduling tables 526 within a storage 522 in the order processing system 504 and stores the shipment data received for the non-offloaded orders from the legacy application 550 in shipment tables 528 in storage 522. Further, offload processing tool 516 stores the delivery or shipment data received for the offloaded orders from the contemporary production application 556 in shipment tables 528. Alternatively, the scheduling data and the shipment data may be stored in a separate storage external to the order processing system 504, such as, in the scheduling tables 538 and shipment tables 540 in storage 536 associated with the middleware 1 (reference numeral 542). Bus 510 provides a communication link between each of the components in computer system 500, such that information can be communicated within the infrastructure 502. External devices 524 can include any devices (e.g., keyboard, pointing device, display, etc.) that enable a user to interact with computer system 500 and/or any devices (e.g., network card, modem, etc.) that enable server 504 to communicate with one or more other computing devices.

Computer infrastructure 502 is only illustrative of various types of computer infrastructures for implementing the invention. For example, in an embodiment shown, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can include any specific purpose computing article of manufacture including hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 522 can include any combination of various types of data storage and/or transmission media that reside at one or more physical locations. Further, I/O interfaces 508 can include any system for exchanging information with one or more external devices 524. Still further, it is understood that one or more additional components (e.g., system software, math co-processing unit, etc.) not shown in FIG. 5 can be included in computer system 500. However, if computer system 500 includes a handheld device or the like, it is understood that one or more external devices 524 (e.g., a display) could be contained within computer system 504, and not externally as shown.

Storage systems 522 and 536 can be any type of system (e.g., a database) capable of providing storage for information under the present invention, such as, the scheduling data tables and shipment data tables. To this extent, storage systems 522 and 536 could include one or more storage devices, such as a magnetic disk drive or an optical disk drive. In another embodiment, storage systems 522 and/or 536 include data distributed across, for example, a local area network (LAN), wide area network (WAN) or a storage area network (SAN) (not shown). Although not shown, additional components, such as cache memory, communication systems, system software, etc., may be incorporated into computer system 500.

Further yet, in another aspect of the invention, there is provided a process for deploying computing infrastructure including integrating computer-readable code into a computing system, such that, the code in combination with the computing system is capable of performing a process for managing orders in a diversified manufacturing environment. The process comprises determining, using a contemporary fulfillment application, whether an order of a plurality of orders is eligible for forwarding to a specific manufacturing site for fulfillment of the order, if the order is eligible for forwarding to the specific manufacturing site, sending a scheduling request message from the contemporary fulfillment application to a legacy scheduling application, the scheduling request message including a code recommending to the legacy scheduling application that the order is to be fulfilled by the specific manufacturing site, wherein the contemporary fulfillment application manages fulfillment of the order by the specific manufacturing site. The process further comprises returning, by the legacy scheduling application to the contemporary fulfillment application, a scheduling response message providing scheduling information for the order and confirming that the order is to be fulfilled by the specific manufacturing site via management by the contemporary fulfillment application, transmitting a shipment request message by the contemporary fulfillment application to a contemporary production application for routing delivery of the order to the specific manufacturing site for fulfillment of the order and receiving a shipment response message from the contemporary production application providing a delivery status of the order routed to the specific manufacturing site, wherein the delivery status comprises at least one of: complete shipment, partial shipment and no shipment. Furthermore, the process comprises updating, by the contemporary fulfillment application, a table configured to track the delivery status of the order shipped from the specific manufacturing site, closing out, by the contemporary fulfillment application, a portion of the order in the shipment request that has been processed and pending closing of the order until the legacy scheduling application has conveyed shipment information pertaining to any portion of the order that has been routed to a manufacturing site determined by the legacy scheduling application. In an embodiment, the determining step further comprises inspecting a header for the order to determine if the order is eligible for forwarding to the specific manufacturing site, conducting checks for each line item of one or more line items contained in the order to determine if the order is eligible for forwarding to the specific manufacturing site and checking whether a line item of the one or more line items contained in the order is stored in a table of one or more tables within the contemporary fulfillment application in order to process the order. In an embodiment, the sending step further comprises sending by the contemporary fulfillment application to a messaging application the scheduling request message having a first format native to the contemporary fulfillment application, reformatting by the messaging application the scheduling request message received from the contemporary fulfillment application having the first format into a scheduling request message having a second format native to the legacy scheduling application and forwarding the scheduling request message having the second format to the legacy scheduling application. In an embodiment, the returning step further comprises returning, by the legacy scheduling application, the scheduling response message having the second format, reformatting by the messaging application the scheduling response message having the second format into a scheduling response message having the first format and forwarding the scheduling response message having the second format to the contemporary fulfillment application. In an embodiment, the transmitting step further comprises generating, by the contemporary fulfillment application, a list of delivery due dates corresponding to a plurality of orders to be fulfilled by the manufacturing site, determining if a date is reached when materials for fulfilling the order are available at the specific manufacturing site and if so, transmitting the shipment request message to the contemporary production application for routing to the specific manufacturing site for initiating shipment of the order.

Accordingly, any of the components of the present invention as shown in FIG. 5 can be deployed, managed, serviced by a service provider 560 who offers to manage orders in a diversified manufacturing environment. Preferably, the invention provides a business method that performs the process steps of the invention on a subscription, advertising and/or fee basis. In particular, a service provider 560 (shown in FIG. 5), such as a solution integrator could offer to manage orders in a diversified manufacturing environment. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of managing orders, said method comprising:
    a computer processor determining, using a contemporary fulfillment application, whether an order from a plurality of orders is eligible for forwarding to a specific manufacturing site for fulfillment of said order, wherein said contemporary fulfillment application has an ability to accommodate a modification to said contemporary fulfillment application to improve communications with other applications for fulfilling said order;
    in response to determining that said order is eligible for forwarding to said specific manufacturing site, sending a scheduling request message from said contemporary fulfillment application to a legacy scheduling application, said scheduling request message including a code recommending to said legacy scheduling application that said order is to be fulfilled by said specific manufacturing site, wherein said contemporary fulfillment application manages fulfillment of said order by said specific manufacturing site, and wherein said legacy scheduling application is capable of interfacing with a manufacturing application to schedule said order, but wherein functionality of said legacy scheduling application is compromised if said legacy scheduling application is transformed;
    in response to determining that said order contains entries that are regulated by a trade agreement act, ending processing of said order;
    in response to determining that said order contains no entries that are regulated by said trade agreement act, continuing to process said order;
    returning, by said legacy scheduling application to said contemporary fulfillment application, a scheduling response message providing scheduling information for said order and confirming that said order is to be fulfilled by said specific manufacturing site via management by said contemporary fulfillment application;
    in response to said scheduling response message being an initial new request message, immediately batch processing said initial new request message;
    in response to said scheduling response message being a rescheduling response message, delaying processing said rescheduling response message until a scheduled batch processing job;
    in response to said scheduling response message being said rescheduling response message, grouping said scheduling response message with other scheduling response messages according to a date, time, and order number of said scheduling response message and said other scheduling response messages;
    transmitting a shipment request message by said contemporary fulfillment application to a contemporary production application for routing delivery of hardware components of said order to said specific manufacturing site for fulfillment of said order, wherein said contemporary fulfillment application only routes orders for said hardware components of said order;
    transmitting another shipment request message by said legacy scheduling application to said specific manufacturing site for fulfillment of software components of said order, wherein said legacy scheduling application only routes orders for said software components of said order; and
    receiving a shipment response message from said contemporary production application providing a delivery status of said order routed to said specific manufacturing site.

2. The method according to claim 1, wherein said order is transmitted via an electronic message that comprises a header, a data segment, and a status record, and wherein said method further comprises:
    inspecting said header for said order to determine if said order is eligible for forwarding to said specific manufacturing site;
    conducting checks for each line item of one or more line items contained in said data segment of said order to determine if said order is eligible for forwarding to said specific manufacturing site;
    checking whether a line item of said one or more line items contained in said order is stored in a table of one or more tables within said contemporary fulfillment application in order to process said order; and
    checking said status record for a processing status of said order at a given point-in-time.

3. The method according to claim 2, further comprising:
    sending by said contemporary fulfillment application to a messaging application said scheduling request message having a first format native to said contemporary fulfillment application;
    reformatting by said messaging application said scheduling request message received from said contemporary fulfillment application having said first format into a scheduling request message having a second format native to said legacy scheduling application; and
    forwarding said scheduling request message having said second format to said legacy scheduling application.

4. The method according to claim 3, further comprising:
    returning, by said legacy scheduling application, said scheduling response message having said second format;
    reformatting by said messaging application said scheduling response message having said second format into a scheduling response message having said first format; and
    forwarding said scheduling response message having said second format to said contemporary fulfillment application.

5. The method according to claim 4, further comprising:
    generating, by said contemporary fulfillment application, a list of delivery due dates corresponding to a plurality of orders to be fulfilled by said manufacturing site;
    determining if a date is reached when materials for fulfilling said order are available at said specific manufacturing site;
    in response to determining that said date is not reached, suspending said order until a next Delivery Due List (DDL), for specific offload shipping points corresponding to specific manufacturing sites from where orders are to be shipped, is run; and in response to determining that said date is reached, transmitting said shipment request message to said contemporary production application for routing to said specific manufacturing site for initiating shipment of said order.

6. The method according to claim 5, further comprising:

routing, by said contemporary production application, said shipment request message received from said contemporary fulfillment application to said specific manufacturing site; and establishing, by said contemporary production application, a delivery status for said order fulfilled by said specific manufacturing site; wherein said delivery status comprises at least one of: complete shipment, partial shipment and no shipment.

7. The method according to claim 6, further comprising:

updating, by said contemporary fulfillment application, a table configured to track said delivery status of said order shipped from said specific manufacturing site.

8. The method according to claim 7, further comprising:

closing out, by said contemporary fulfillment application, a portion of said order in said shipment request that has been processed; and suspending closing of a remainder of said order until said legacy scheduling application has conveyed shipment information pertaining to any portion of said order that has been routed to a manufacturing site determined by said legacy scheduling application.

9. A system for routing a customer order to a preferred manufacturing site, comprising:

a processor, a system memory, and a computer storage device, wherein the processor executes instructions in the system memory that have been received from the computer storage device to:

determine, using a contemporary fulfillment application, whether an order of a plurality of orders is eligible for forwarding to a specific manufacturing site for fulfillment of said order, wherein said contemporary fulfillment application has an ability to accommodate a modification to said contemporary fulfillment application to improve communications with other applications for fulfilling said order;

in response to determining that said order is eligible for forwarding to said specific manufacturing site, send a scheduling request message from said contemporary fulfillment application to a legacy scheduling application, said scheduling request message including a code recommending to said legacy scheduling application that said order is to be fulfilled by said specific manufacturing site; wherein said contemporary fulfillment application manages fulfillment of said order by said specific manufacturing site, and wherein said legacy scheduling application is capable of interfacing with a manufacturing application to schedule said order, but wherein functionality of said legacy scheduling application is compromised if said legacy scheduling application is transformed;

return, by said legacy scheduling application to said contemporary fulfillment application, a scheduling response message providing scheduling information for said order and confirming that said order is to be fulfilled by said specific manufacturing site via management by said contemporary fulfillment application;

in response to said scheduling response message being an initial new request message, immediately batch process said initial new request message;

in response to said scheduling response message being a rescheduling response message, delay processing said rescheduling response message until a scheduled batch processing job;

transmit a shipment request message by said contemporary fulfillment application to a contemporary production application for routing delivery of hardware components of said order to said specific manufacturing site for fulfillment of said order, wherein said contemporary fulfillment application only routes orders for said hardware components of said order;

transmit another shipment request message by said legacy scheduling application to said specific manufacturing site for fulfillment of software components of said order, wherein said legacy scheduling application only routes orders for said software components of said order; and receive a shipment response message from said contemporary production application providing a delivery status of said order routed to said specific manufacturing site.

10. The system according to claim 9, wherein said instructions are further configured to determine if said customer order is to be fulfilled by said preferred manufacturing site and, if so, to include said administrative feature code in said scheduling request sent to request that said customer order be fulfilled by said specific manufacturing site, and wherein the scheduling request message is not sent if the order is not to be fulfilled by the specific manufacturing site.

11. The system according to claim 10, wherein said instructions are further configured to ascertain a date when materials are available at said specific manufacturing site for shipping said customer order and to generate, upon reaching said date ascertained, said shipment request for routing said customer order to said specific manufacturing site for shipment.

12. The system according to claim 11, wherein said instructions are further configured to update a table for tracking a delivery status for said order shipped from said specific manufacturing site.

13. The system according to claim 12, wherein said instructions are further configured to provide a delivery status for said order routed to said specific manufacturing site, and wherein said instructions are further configured to provide a shipping status for any portion of said order routed to a legacy manufacturing site.

14. A computer program product for managing a customer order, said computer program product comprising computer executable instructions stored on a non-transitory computer readable storage medium, wherein the computer executed instructions, when executed:

determine, using a contemporary fulfillment application, whether an order of a plurality of orders is eligible for forwarding to a specific manufacturing site for fulfillment of said order, wherein said contemporary fulfillment application has an ability to accommodate a modification to said contemporary fulfillment application to improve communications with other applications for fulfilling said order;

in response to determining that said order is eligible for forwarding to said specific manufacturing site, send a scheduling request message from said contemporary fulfillment application to a legacy scheduling application, said scheduling request message including a code recommending to said legacy scheduling application that said order is to be fulfilled by said specific manufacturing site; wherein said contemporary fulfillment application manages fulfillment of said order by said specific manufacturing site, and wherein said legacy scheduling application is capable of interfacing with a manufacturing application to schedule said order, but wherein functionality of said legacy scheduling application is compromised if said legacy scheduling application is transformed;

return, by said legacy scheduling application to said contemporary fulfillment application, a scheduling response message providing scheduling information for said order and confirming that said order is to be fulfilled by said specific manufacturing site via management by said contemporary fulfillment application;

in response to said scheduling response message being an initial new request message, immediately batch process said initial new request message;

in response to said scheduling response message being a rescheduling response message, delay processing said rescheduling response message until a scheduled batch processing job;

transmit a shipment request message by said contemporary fulfillment application to a contemporary production application for routing delivery of hardware components of said order to said specific manufacturing site for fulfillment of said order, wherein said contemporary fulfillment application only routes orders for hardware components;

transmit another shipment request message by said legacy scheduling application to said specific manufacturing site for fulfillment of software components of said order, wherein said legacy scheduling application only routes orders for software components; and receive a shipment response message from said contemporary production application providing a delivery status of said order routed to said specific manufacturing site.

15. The computer program product according to claim 14, further comprising instructions to inspect a header, to conduct checks for each line item of one or more line items contained in said order, and to check whether a line item of said one or more line items contained in said order is stored in a table of one or more tables in order to process said order for fulfillment by said specific manufacturing site.

16. The computer program product according to claim 15, further comprising instructions to reformat, using a messaging application, said scheduling request message from a first format native to said contemporary fulfillment application into a second format native to said legacy scheduling application before sending said scheduling request message to said legacy scheduling application.

17. The computer program product according to claim 16, further comprising instructions to reformat said scheduling response message having said second format native to said legacy scheduling application into said scheduling response message having said first format native to said contemporary fulfillment application before returning said scheduling response message to said contemporary fulfillment application.

18. The computer program product according to claim 17, further comprising instructions to generate, using said contemporary fulfillment application, a list of delivery due dates corresponding to a plurality of customer orders to be fulfilled by said specific manufacturing site, to determine if a date is reached when materials for fulfilling said order are available at said specific manufacturing site and, if so, to transmit said shipment request message to said contemporary production application for routing to said specific manufacturing site for initiating shipment of said order, and if said date is not reached, then suspending said order until a next Delivery Due List (DDL) for specific offload shipping points corresponding to specific manufacturing sites from where orders are to be shipped is run.

19. A process for deploying computing infrastructure comprising integrating computer-readable code into a computing system, wherein said code in combination with said computing system is capable of performing a process for managing orders in a diversified manufacturing environment, said process comprising:

determining, using a contemporary fulfillment application, whether an order of a plurality of orders is eligible for forwarding to a specific manufacturing site for fulfillment of said order, wherein said contemporary fulfillment application has an ability to accommodate a modification to said contemporary fulfillment application to improve communications with other applications for fulfilling said order;

in response to determining that said order is eligible for forwarding to said specific manufacturing site, sending a scheduling request message from said contemporary fulfillment application to a legacy scheduling application, said scheduling request message including a code recommending to said legacy scheduling application that said order is to be fulfilled by said specific manufacturing site; wherein said contemporary fulfillment application manages fulfillment of said order by said specific manufacturing site, and wherein said legacy scheduling application is capable of interfacing with a manufacturing application to schedule said order, but wherein functionality of said legacy scheduling application is compromised if said legacy scheduling application is transformed;

returning, by said legacy scheduling application to said contemporary fulfillment application, a scheduling response message providing scheduling information for said order and confirming that said order is to be fulfilled by said specific manufacturing site via management by said contemporary fulfillment application;

in response to said scheduling response message being an initial new request message, immediately batch processing said initial new request message;

in response to said scheduling response message being a rescheduling response message, delaying processing said rescheduling response message until a scheduled batch processing job;

transmitting a shipment request message by said contemporary fulfillment application to a contemporary production application for routing delivery of hardware components of said order to said specific manufacturing site for fulfillment of said order, wherein said contemporary fulfillment application only routes orders for said hardware components;

transmitting another shipment request message by said legacy scheduling application to said specific manufacturing site for fulfillment of software components of said order, wherein said legacy scheduling application only routes orders for said software components; and receiving a shipment response message from said contemporary production application providing a delivery status of said order routed to said specific manufacturing site.

20. The process according to claim 19, wherein said order is transmitted via an electronic message that comprises a header, a data segment, and a status record, and wherein said process further comprises:

inspecting said header for said order to determine if said order is eligible for forwarding to said specific manufacturing site;

conducting checks for each line item of one or more line items contained in said data segment of said order to determine if said order is eligible for forwarding to said specific manufacturing site;

checking whether a line item of said one or more line items contained in said order is stored in a table of one or more tables within said contemporary fulfillment application in order to process said order; and checking said status record for a processing status of said order at a given point-in-time.

21. The process according to claim 20, wherein said process further comprises:

sending by said contemporary fulfillment application to a messaging application said scheduling request message having a first format native to said contemporary fulfillment application;

reformatting by said messaging application said scheduling request message received from said contemporary fulfillment application having said first format into a scheduling request message having a second format native to said legacy scheduling application; and forwarding said scheduling request message having said second format to said legacy scheduling application.

22. The process according to claim 21, wherein said process further comprises:

returning, by said legacy scheduling application, said scheduling response message having said second format;

reformatting by said messaging application said scheduling response message having said second format into a scheduling response message having said first format; and forwarding said scheduling response message having said second format to said contemporary fulfillment application.

23. The process according to claim 22, wherein said process further comprises:

generating, by said contemporary fulfillment application, a list of delivery due dates corresponding to a plurality of orders to be fulfilled by said specific manufacturing site;

determining if a date is reached when materials for fulfilling said order are available at said specific manufacturing site;

in response to said date not being reached, then suspending said order until a next Delivery Due List (DDL) for specific offload shipping points corresponding to specific manufacturing sites from where orders are to be shipped is run; and in response to said date being reached, transmitting said shipment request message to said contemporary production application for routing to said specific manufacturing site for initiating shipment of said order.

* * * * *